United States Patent
Harshman

(10) Patent No.: US 10,695,716 B2
(45) Date of Patent: Jun. 30, 2020

(54) ADDITION OF ALKALINE MATERIALS TO BIOTRICKLING FILTER OR BIO-FILTER MAKE-UP WATER

(71) Applicant: EVOQUA WATER TECHNOLOGIES LLC, Warrendale, PA (US)

(72) Inventor: James Vaughan Harshman, Bradenton, FL (US)

(73) Assignee: Evoqua Water Technologies LLC, Pittsburgh, PA (US)

(*) Notice: Subject to any disclaimer, the term of this patent is extended or adjusted under 35 U.S.C. 154(b) by 606 days.

(21) Appl. No.: 14/932,721

(22) Filed: Nov. 4, 2015

(65) Prior Publication Data
US 2016/0051929 A1    Feb. 25, 2016

Related U.S. Application Data

(63) Continuation-in-part of application No. 14/523,303, filed on Oct. 24, 2014, now Pat. No. 9,586,176, and
(Continued)

(51) Int. Cl.
*B01D 53/85* (2006.01)
*B01D 53/52* (2006.01)
(Continued)

(52) U.S. Cl.
CPC .......... *B01D 53/85* (2013.01); *B01D 53/52* (2013.01); *B01D 53/84* (2013.01); *C02F 3/04* (2013.01); *C02F 3/345* (2013.01); *B01D 53/346* (2013.01); *B01D 2251/304* (2013.01); *B01D 2251/306* (2013.01); *B01D 2251/402* (2013.01); *B01D 2251/404* (2013.01); *B01D 2251/604* (2013.01); *B01D 2251/606* (2013.01); *B01D 2251/95* (2013.01); *B01D 2252/103* (2013.01); *B01D 2257/304* (2013.01); *B01D 2258/06* (2013.01); *C02F 2101/101* (2013.01); *C02F 2209/006* (2013.01); *C02F 2209/06* (2013.01); *C02F 2303/02* (2013.01); *Y02A 50/2358* (2018.01)

(58) Field of Classification Search
CPC ........ B01D 53/85; B01D 53/84; B01D 53/52; C02F 3/345; C02F 3/04
See application file for complete search history.

(56) References Cited

U.S. PATENT DOCUMENTS 5,133,875 A * 7/1992 Carnahan ............... B01D 53/34
                                                              210/188
5,826,251 A    10/1998 Kiendl
(Continued)

OTHER PUBLICATIONS

Turschmid and A. A. Khan and N. Rapal, "Fuzzy PID Controller: Design, Tuning and Comparison with Conventional PID Controller," 2006 IEEE International Conference on Engineering of Intelligent Systems, Islamabad, 2006, pp. 1-6. (Year: 2006).*
(Continued)

*Primary Examiner* — Matthew D Krcha

(57) ABSTRACT

A system for removing undesirable compounds from contaminated air includes a biofilter having an alkaline material introduction system and a fuzzy-logic based controller. A contaminant, such as hydrogen sulfide, is removed from contaminated air by passing the contaminated air through the biofilter.

19 Claims, 11 Drawing Sheets

Related U.S. Application Data a continuation-in-part of application No. 14/270,461, filed on May 6, 2014, now abandoned, and a continuation-in-part of application No. 14/920,407, filed on Oct. 22, 2015, now Pat. No. 10,159,932, which is a continuation-in-part of application No. 14/270,461, filed on May 6, 2014, now abandoned.

(60) Provisional application No. 61/895,645, filed on Oct. 25, 2013, provisional application No. 62/078,632, filed on Nov. 12, 2014, provisional application No. 62/084,007, filed on Nov. 25, 2014.

(51) Int. Cl.
*C02F 3/04* (2006.01)
*C02F 3/34* (2006.01)
*B01D 53/84* (2006.01)
B01D 53/34 (2006.01)
C02F 101/10 (2006.01)

(56) References Cited

U.S. PATENT DOCUMENTS

| | | | |
|---|---|---|---|
| 5,831,850 A | 11/1998 | Chebre et al. | |
| 5,833,766 A * | 11/1998 | Osterwald | B01D 41/04 134/20 |
| 6,013,512 A * | 1/2000 | Turschmid | B01D 53/84 210/615 |
| 6,454,834 B1 * | 9/2002 | Livingstone | B01D 53/04 55/385.3 |
| 8,772,015 B2 | 7/2014 | Husain et al. | |
| 2001/0005525 A1 * | 6/2001 | Scheufler | B01D 46/12 427/195 |
| 2004/0152185 A1 | 8/2004 | Egan et al. | |
| 2007/0084795 A1 | 4/2007 | Jordan | |
| 2007/0180802 A1 * | 8/2007 | Parker | B01D 53/84 55/485 |
| 2008/0096268 A1 | 4/2008 | Herner et al. | |
| 2008/0308493 A1 * | 12/2008 | Amir | C02F 3/006 210/610 |
| 2010/0129895 A1 | 5/2010 | Crawford | |
| 2013/0318935 A1 | 12/2013 | Mallinen | |

OTHER PUBLICATIONS

"PID plus fuzzy controller structures as a design base for industrial applications," Reznik, et al., Engineering Applications of Artificial Intelligence, 113, 2000, pp. 419-430. (Year: 2000).*

"Fuzzy Controllers," Reznik, Newnes—Butterworth—Heinemann, Oxford, UK, 1997, pp. 136-141. (Year: 1997).*

Kaehler, Steven "Fuzzy Logic—An Introduction" http://www.seattlerobotics.org/encoder/dec97/fuzzy.html, 1998.

Internet Archive WaybackMachine http://web.archive.org/web/20000601000000*/http://www.seattlerobotics.org/encoder/dec97/fuzzy.html, 1998.

Khan, Asim, et al., "Fuzzy PID Controller: Design, Tuning and Comparison with Conventional PID Controller," 2006 IEEE International Conference on Engineering of Intelligent Systems, Islamabad, 2006, pp. 1-6.

* cited by examiner

ADDITION OF ALKALINE MATERIALS TO BIOTRICKLING FILTER OR BIO-FILTER MAKE-UP WATER

CROSS-REFERENCE TO RELATED APPLICATION

This application claims the benefit under 35 U.S.C. § 120 as a continuation-in-part of U.S. application Ser. No. 14/523, 303, "BIOFILTER WITH FUZZY LOGIC CONTROL," filed Oct. 24, 2014, which claims priority under 35 U.S.C. § 119(e) to U.S. Provisional Application No. 61/895,645, titled "FUZZY LOGIC CONTROL OF pH ON A BIOTRICKLING FILTER," filed Oct. 25, 2013. This application to also claims the benefit under 35 U.S.C. § 120 as a continuation-in part of U.S. application Ser. No. 14/270,461, titled "USE OF SINTERED GLASS AS MEDIA FOR BIOFILTER TO REMOVE ODOROUS COMPOUNDS FROM AN AIR STREAM," filed on May 6, 2014. This application also claims the benefit under 35 U.S.C. § 120 as a continuation-in part of U.S. application Ser. No. 14/920, 407, titled "USE OF POROUS GLASS MEDIA FOR A BIOFILTER TO REMOVE ODOROUS COMPOUNDS FROM AN AIR STREAM," filed on Oct. 22, 2015 which claims the benefit under 35 U.S.C. § 120 as a continuation-in part of U.S. application Ser. No. 14/270,461 and which claims priority under 35 U.S.C. § 119(e) to U.S. Provisional Application Ser. No. 62/084,007, titled "USE OF FOAMED GLASS AS MEDIA FOR A BIOFILTER TO REMOVE ODOROUS COMPOUNDS FROM AN AIR STREAM," filed on Nov. 25, 2014. This application also claims priority under 35 U.S.C. § 119(e) to U.S. Provisional Application Ser. No. 62/078,632, titled "ADDITION OF ALKALINE MATERIALS TO BIOTRICKLING FILTER OR BIO-FILTER MAKE-UP WATER," filed Nov. 12, 2014. Each of these applications is incorporated herein by reference in its entirety for all purposes.

BACKGROUND

1. Field of Invention

Aspects and embodiments disclosed herein are directed to treatment of air streams, and more particularly, to systems and methods for removing odor causing compounds from air streams.

2. Discussion of Related Art

Sewage systems typically include conduits that collect and direct sewage and other waste streams, such as industrial effluents, to a treatment facility. Such systems typically include various pumping facilities, such as lift stations, that facilitate the transfer of wastewater to such treatment facilities. During transit odorous species are often generated. Such odorous species may be objectionable when released or discharged. Untreated sewage may generate multiple odor-causing compounds. One of the most prevalent and most distinctive compounds formed is hydrogen sulfide to ($H_2S$). Other objectionable or odor-causing compounds from contaminated air streams may include compounds resulting from the volatilization of reduced sulfur compounds in a sewage or wastewater stream such as any one or more of carbon disulfide, dimethyl sulfide, dimethyl disulfide, dimethyl trisulfide, methyl mercaptans, ethyl mercaptans, butyl mercaptans, allyl mercaptans, propyl mercaptans, crotyl mercaptans, benzyl mercaptans, thiophenol, sulfur dioxide, and carbon oxysulfide.

SUMMARY

In accordance with an aspect of the present invention, there is provided a biotrickling filter for the treatment of contaminated air. The biotrickling filter comprises a vessel, a contaminated air inlet in fluid communication with an internal volume of the vessel, a treated air outlet in fluid communication with the internal volume the vessel, a media bed disposed within the vessel and in fluid communication between the contaminated air inlet and the treated air outlet, and biofiltering media disposed in the media bed. The biofiltering media is configured to support growth and maintenance of a population of hydrogen sulfide oxidizing bacteria on the biofiltering media. A water introduction system is configured to introduce water from a source of water into the vessel, and an alkaline material introduction system is configured to introduce an alkaline material from a source of alkaline material into the vessel.

In some embodiments, the biotrickling filter further comprises a manually operated flow valve configured to regulate a rate of introduction of the water and/or alkaline material into the vessel.

In some embodiments, the biotrickling filter further comprises an electronic control system configured to automatically regulate a rate of introduction of the water and/or alkaline material into vessel. The biotrickling filter may further comprise a pH probe positioned downstream of the media bed and configured to measure a pH of liquid having passed through the media bed and to provide an indication of the pH to the electronic control system. The biotrickling filter may further comprise a sump. The pH probe may be disposed in the sump.

In some embodiments, the electronic control system is configured to regulate the rate of introduction of the alkaline material into the vessel responsive to the indication of the pH. The electronic control system may be configured to maintain the pH between about 0 and about 4. The electronic control system may be configured to maintain the pH between about 1.6 and about 2.2.

In some embodiments, the alkaline material introduction system is configured to introduce the alkaline material into the vessel with the water from the source of water.

In some embodiments, the vessel comprises a sump and the source of water is the sump. The alkaline material introduction system may be configured to introduce the alkaline material into the sump.

In some embodiments, the source of water is a source of make-up water external to the vessel.

In some embodiments, the alkaline material includes one or more of magnesium hydroxide, potassium hydroxide, calcium hydroxide, sodium hydroxide, potassium carbonate, and sodium carbonate.

In accordance with another aspect, there is provided a method of removing an undesirable compound from contaminated air. The method comprises flowing the contaminated air through a biotrickling filter including a media bed and a population of hydrogen sulfide oxidizing bacteria disposed on media in the media bed, introducing water from a source of water into the biotrickling filter, measuring one of a pH of water within the biotrickling filter and a pH of water exiting the biotrickling filter, and maintaining the pH of the one of the water within the biotrickling filter and the water exiting the biotrickling filter within a predetermined range by adding an alkaline material to the biotrickling filter and controlling an amount of the alkaline material added to the biotrickling filter per unit time.

In some embodiments, the method further comprises adjusting an amount of water introduced to the biotrickling filter per unit of time.

In some embodiments, the method further comprises introducing the alkaline material into the biotrickling filter at a fixed rate and adjusting an amount of water introduced to the biotrickling filter per unit of time.

In some embodiments, the method further comprises introducing the water into the biotrickling filter at a fixed rate and adjusting an amount of the alkaline to material introduced to the biotrickling filter per unit of time.

In some embodiments, the method further comprises controlling one of an amount of water introduced to the biotrickling filter per unit of time and the amount of the alkaline material added to the biotrickling filter per unit time with a manually operated flow controller.

In some embodiments, the method further comprises controlling one of the amount of water introduced to the biotrickling filter per unit of time and the amount of the alkali material added to the biotrickling filter per unit time with an electronic controller.

In some embodiments, the method further comprises controlling one of an amount of water introduced to the biotrickling filter per unit of time and the amount of the alkali material added to the biotrickling filter per unit time with a fuzzy logic-based controller.

In some embodiments, the method further comprises measuring a pH of water having passed through the media bed, providing an indication of the pH to the fuzzy logic-based controller, and utilizing the pH as an input parameter in an algorithm used by the fuzzy logic-based controller to automatically control the one of the amount of water introduced to the biotrickling filter per unit of time and the amount of the alkali material added to the biotrickling filter per unit of time.

In some embodiments, the method further comprises selecting the predetermined range to maintain the pH in the media bed within a range conducive to maintenance of the population of hydrogen sulfide oxidizing bacteria in the media bed.

In accordance with another aspect, there is provided a method of reducing water consumption of a biotrickling filter. The method comprises adding a pH adjustment system to the biotrickling filter. The pH adjustment system is configured to introduce an alkaline material from a source of alkaline material into the biotrickling filter, measure a pH of a liquid in the biotrickling filter, and control a rate of introduction of the alkaline material and a rate of introduction of water into the biotrickling filter to be sufficient to maintain the pH of the liquid within a range to conducive to maintain a population of hydrogen sulfide oxidizing bacteria in a media bed of the biotrickling filter and to prevent clogging of the media bed.

In some embodiments, the method comprises controlling the rate of introduction of the alkaline material and the rate of introduction of the water with a fuzzy logic controller utilizing the pH as an input parameter of a fuzzy logic control algorithm.

In some embodiments, reducing the water consumption of the biotrickling filter includes reducing the water consumption of the biotrickling filter by at least about 50%. Reducing the water consumption of biotrickling filter may include reducing the water consumption of the biotrickling filter by at least about 99%. In accordance with another aspect, there is provided a wastewater treatment system. The wastewater treatment system comprises a basin including a wastewater inlet fluidly connected to a source of wastewater, a process gas outlet configured to output sulfur-containing process gas generated by the wastewater from the basin, a source of alkaline material, and a biotrickling filter. The biotrickling filter comprises a vessel, a contaminated air inlet providing fluid communication between an internal volume of the vessel and the process gas outlet, a treated air outlet in fluid communication with the internal volume the vessel, a media bed disposed within the vessel and in fluid communication between the contaminated air inlet and the treated air outlet, and biofiltering media disposed in the media bed. The biofiltering media is configured to support growth and maintenance of a population of hydrogen sulfide oxidizing bacteria on the biofiltering media. A water introduction system is configured to introduce water from a source of water into the vessel, and an alkaline material introduction system is configured to introduce an alkaline material from the source of alkaline material into the vessel.

In some embodiments, the system further comprises a sensor configured to measure a pH of a liquid within the vessel and to provide an indication of the pH to a controller configured to regulate a rate of introduction of the water and a rate of introduction of the alkaline material into the vessel.

In some embodiments, the controller is configured to regulate the rate of introduction of the water and the rate of introduction of the alkaline material into the to vessel based on an output of a fuzzy logic algorithm utilizing the indication of the pH as an input parameter.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
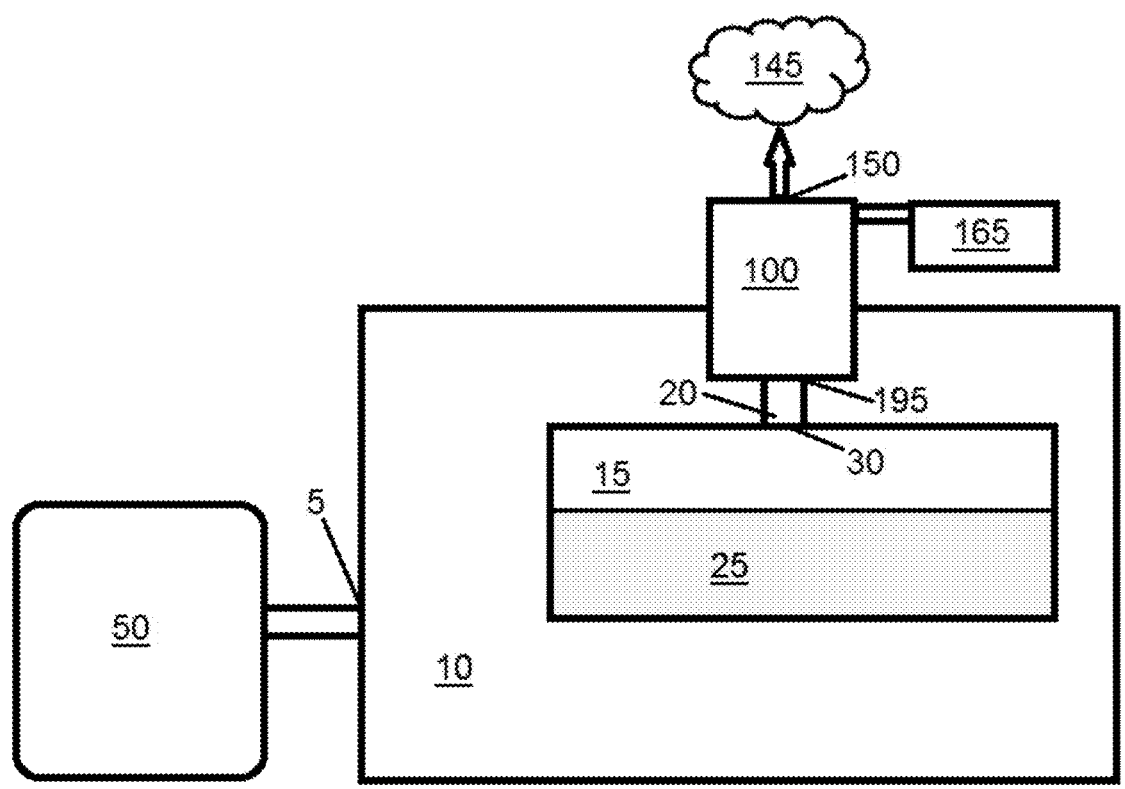
FIG. 1 is a schematic diagram of a system generating an objectionable gaseous species and a biofilter coupled to the system to remove the objectionable gaseous species from air from the system.

Aspects and embodiments disclosed herein are not limited to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having,"

"containing," "involving," and variations thereof herein is meant to encompass the items listed thereafter and equivalents thereof as well as additional items.

In wastewater treatment systems, various undesirable chemical species may be generated, as discussed in the background section. Hydrogen sulfide ($H_2S$) is an example of such a species. Hydrogen sulfide is generated in some wastewater treatment systems and is considered an undesirable byproduct. Even small concentrations of $H_2S$ can negatively impact the air quality in the vicinity of a wastewater treatment plant or other components of a wastewater treatment system.

It is generally desirable to remove hydrogen sulfide from air streams from sewage systems, manhole headspaces, wastewater treatment systems, and/or other systems in which hydrogen sulfide may be generated. Aspects and embodiments disclosed herein include systems and methods for removing hydrogen sulfide from contaminated air streams. Aspects and embodiments disclosed herein may also be utilized to remove other objectionable and/or odor causing compounds from contaminated air streams, for example, compounds resulting from the volatilization of reduced sulfur compounds in a sewage or wastewater stream such as any one or more of carbon disulfide, dimethyl sulfide, dimethyl disulfide, dimethyl trisulfide, methyl mercaptans, ethyl mercaptans, butyl mercaptans, allyl mercaptans, propyl mercaptans, crotyl mercaptans, benzyl mercaptans, thiophenol, sulfur dioxide, and carbon oxysulfide, or hydrogen sulfide generated from any of these compounds by sulfate reducing bacteria. For the sake of simplicity, however, aspects and embodiments disclosed herein will be described as removing hydrogen sulfide from contaminated gas streams.

As illustrated schematically in FIG. 1, a system 10, for example, a wastewater treatment system or a sewer system has an inlet 5 in fluid communication with a source 50 of, liquid, for example, wastewater. The system 10 includes a space 15, for example, a conduit, a lift station, a wastewater treatment basin, etc., that includes liquid 25, for example, wastewater, that generates one or more objectionable gaseous species, for example, hydrogen sulfide or any one or more of the other compounds discussed above. A biofilter, or in some embodiments, a biotrickling filter 100 may be provided to remove one or more of the objectionable gaseous species from air in or exiting the space 15. As used herein, the term "biofilter" encompasses "biotrickling filters." A contaminated air inlet 195 in fluid communication with an internal volume of the biofilter 100 vessel may be coupled to a headspace of the space 15 by a conduit 20 providing fluid communication between a process gas outlet 30 of the space 15 and the contaminated air inlet 195. In other embodiments, the biofilter 100 may be disposed within the space 15. The biofilter 100 draws contaminated air from the headspace of the space 15 into the contaminated air inlet 195, treats the contaminated air to remove the one or more of the objectionable gaseous species, for example, by oxidation by sulfur compound oxidizing bacteria, and releases the resultant treated air though a treated air outlet 150 in fluid communication with the internal volume of the biofilter 100 vessel into the environment 145 and/or back into the space 15. In some embodiments, the system 10 further includes a source 165 of an alkali material configured to provide alkaline material to the biofilter 100 vessel.

As discussed with reference to FIG. 2A, the biofilter 100 may include a water introduction system configured to introduce water from a source of water into the biofilter vessel and an alkaline material introduction system configured to introduce an alkaline material from the source of alkaline material into the vessel. As further discussed with reference to FIG. 2A, the biofilter 100 may include a sensor configured to measure a pH of a liquid within the vessel and to provide an indication of the pH to a controller configured to regulate a rate of introduction of the water and a rate of introduction of the alkaline material into the vessel. The controller may be configured to regulate the rate of introduction of the water and the rate of introduction of the alkaline material into the vessel based on an output of a fuzzy logic algorithm utilizing the indication of the pH as an input parameter.

Hydrogen sulfide may be formed in wastewater streams by the conversion of sulfates to sulfides by sulfide reducing bacteria (SRBs) under anaerobic conditions. Hydrogen sulfide is dissolvable in water (up to about 0.4 g/100 ml at 20° C. and 1 atmosphere). In water, hydrogen sulfide exists in equilibrium with the bisulfide ion, $HS^-$, and the sulfide ion, $S^{2-}$. Unlike sulfide and bisulfide, hydrogen sulfide is volatile, with a vapor pressure of about $1.56 \times 10^4$ mm Hg (2.1 MPa) at 25° C., and may emerge from aqueous solution to form gaseous hydrogen sulfide. The presence of hydrogen sulfide in sewer systems is undesirable due to its offensive odor, toxicity, and corrosivity.

Gaseous hydrogen sulfide exhibits a characteristic unpleasant odor suggestive of rotten eggs. Humans can detect this odor at hydrogen sulfide concentrations as low as four parts per billion (ppb). Hydrogen sulfide is considered toxic. Extended exposure to a few hundred parts per million (ppm) can cause unconsciousness and death. Accordingly, the presence of hydrogen sulfide in sewer systems is found objectionable to people who may come into contact with the gaseous effluent from such sewer systems.

Hydrogen sulfide also supports the growth of organisms such as thiothrix and *beggiatoa*. These are filamentous organisms which are associated with bulking problems in activated sludge treatment systems.

Various methods and apparatuses are used to control $H_2S$ emissions. One such apparatus is a biofilter. A biotrickling filter is one kind of biofilter. A biotrickling filter utilizes a population of hydrogen sulfide oxidizing bacteria to remove hydrogen sulfide from the vapor phase by converting it to sulfuric acid. The production of sulfuric acid lowers the pH of the biofilter bed. Constant dilution and recirculation of water over the bed facilitates stabilization and maintenance of the pH of the biofilter bed at a level conducive for the bacteria to thrive. Traditionally the introduction of fresh water, called make-up water, is done at a constant, unchanging flow set by a manually operated valve.

Hydrogen sulfide loadings change in a cyclical manner to reflect high and low usage of the sewage collection system throughout the day. This cyclical increase and decrease in hydrogen sulfide loadings may result in a cyclical rise and fall of pH of the biofilter bed. By using a fixed flow rate of make-up water, the system is incapable of dynamically adjusting to the changes in hydrogen sulfide loadings. The result is that the flow of make-up water will at times be insufficient for meeting the demands of high loadings of $H_2S$ in the system, while at other times be excessive during low loadings of $H_2S$. This results in previously unappreciated problems such as difficulties in maintaining a desired pH in the system or removing a desired amount of $H_2S$. Further, using a fixed flow rate of make-up water to a biofilter often results in a previously unappreciated significant amount of water waste.

A biotrickling filter comprises a vessel including a media bed compartment packed with media. A source of liquid constituting a treatment water is sprayed on top of the media and this liquid trickles down through the media to a sump to become a treatment water effluent. In a biotrickling filter, at least some of this treatment water effluent is recirculated. By providing a moist environment, bacteria are encouraged to grow on the media. Air laden with $H_2S$ is introduced to the bottom of the vessel. As the air rises through the media, an exchange between the gaseous and liquid phase occurs where $H_2S$ is removed from the air, either by dissolving or direct biotreatment. Air, low in $H_2S$ concentration, exits the top of the vessel. Alternatively, top down air flow through the biofilter could be used.

During biotreatment, $H_2S$ is oxidized to $H_2SO_4$ (sulfuric acid). $H_2S$ or its ionic forms $HS^-$ or $S^{2-}$ are used as an energy source by litho-autotrophic bacteria such as *thiobacillus*. These bacteria require a carbon source which may be carbon dioxide or dissolved carbonate as well as organic carbon compounds. There are several possible intermediate sulfur species such as $S^0$, $S_2O_3^{2-}$, and $SO_3^{2-}$ that may be produced during the oxidation process. Their production depends on the $H_2S$ loading, pH, oxygen concentration, and temperature within the biofilter.

The use of a biofilter represents a continuous process to remove $H_2S$ from emissions from a wastewater stream by biotreatment. This biotreatment utilizes bacteria to oxidize the $H_2S$ to sulfuric acid and then flushes the sulfuric acid out of the system as a liquid solution.

Aspects and embodiments disclosed herein may remove hydrogen sulfide from a contaminated gas stream by the biological conversion of the hydrogen sulfide into less objectionable or less odorous compounds. In some embodiments, hydrogen sulfide oxidizing bacteria, for example, one or more of *ancalochloris beggiatoa, beggiatoa alba, sulfobacillus, thiobacillus denitrificans, thiohalocapsa halophila, thiomargarita,* or *thioploca* oxidize hydrogen sulfide into sulfuric acid ($H_2SO_4$). In some embodiments, the hydrogen sulfide oxidizing bacteria (referred to hereinafter as simply "bacteria"), are present on a media material disposed in a body of a biofilter. The bacteria may form a biofilm on surfaces of the media material. Contaminated air passed through the biofilter contacts the bacteria contained therein and the bacteria remove hydrogen sulfide from the contaminated air by oxidizing the hydrogen sulfide into sulfuric acid. In some embodiments, the biofilter is supplied with water and various nutrients, for example, nitrogen, potassium, and phosphorus compounds, to provide an environment within the biofilter conducive for the maintenance and/or growth of desirable bacteria populations. The supply of water and nutrients to the biofilter is, in some embodiments, controlled in response to the results of measurements of parameters including, for example, pH and nutrient concentration of liquid within various portions of the biofilter and/or of effluent or waste liquid drained from the biofilter.

In new installations, bacteria may migrate into a new biofilter along with water vapor from an environment in which the new biofilter is installed to establish a bacterial population effective for the removal of odorous compounds from contaminated air from the environment. The establishment of a sufficiently large bacterial population within the biofilter (referred to herein as "acclimation" of the biofilter) may take between about a few days and about a week. In some implementations, a biofilter may be "seeded" with desirable bacteria to shorten the time period required for the biofilter to acclimate.

One important aspect of the operation of biofilters is the control of the pH of the liquid in contact with the media. The pH may be measured in the effluent or blow-down or purge from the biofilter. For a given vessel, there is a range of pH that is conducive to acceptable operation. This pH may be in the range of from about 0 to about 4 or from about 1.6 to about 2.2. It has been found that flowing liquid having a pH in the range of from about 0 to about 4 or from about 1.6 to about 2.2 through the media bed of a biofilter is conducive to growing and/or maintaining a population of hydrogen sulfide oxidizing bacteria on media in a media bed of a biofilter. It has been found that if the pH is too low, fouling of the media occurs. If the pH is too high, the removal efficiency of $H_2S$ drops. Thus, it is important to control the pH in the biofilter, for example, as determined by a measurement of pH of effluent from the biofilter. Normally, in previous implementations, pH is controlled by varying the rate of addition of make-up water to the biofilter. If the pH is too low, the flow rate of make-up water to the biofilter is increased. If the pH is too high, the flow rate of make-up water is decreased.

The cost of water is a significant part of the operational costs of a biofiltration system and a target for improvement. A typical system may use from 53,000 L (14,000 gallons) per day for smaller units to 120,000 L (30,000 gallons) per day for larger units depending on loadings and limits of a water supply at a site. This amounts to up to about 9 million gallons of water consumed per year for some systems. For one municipality in Florida, the cost of water alone in operating a 3-stage biotrickling filter system (BTF) is roughly $67,000 per year. Reducing the usage of water in these systems to lower operation costs and better use scarce water resources is an important goal in the sustainable design of these systems.

Aspects and embodiments disclosed herein are directed to systems and methods for achieving and/or maintaining a desirable pH in a biotrickling filter by partial neutralization of sulfuric acid produced during operation by dosing alkaline material into the biotrickling filter. In implementations where the site supply of make-up water is not sufficient, this would allow a biotrickling filter to function as if it had an adequate water supply. Dosing a sufficient amount of alkaline material may achieve an aggressive reduction in water usage, however, in some embodiments, the to entire balance of make-up water is not replaced with alkaline material due to system losses from evaporation and to prevent concentration of salts within the biofilter. Aspects and embodiments disclosed herein achieve significant water reduction as compared to systems that do not utilize alkaline material to partially neutralize the sulfuric acid generated in the biofilter, for example, greater than 50% reduction in water usage, greater than 99% reduction in water usage, or up to about 99.9% reduction in water usage, without negatively impacting system performance.

In some embodiments, alkaline material is added to the makeup water that is used to control the pH within a biotrickling filter. The alkaline material may include a water soluble or partially water soluble alkaline material, or a material that may form a slurry when mixed with water. Examples of alkaline materials that may be utilized with various embodiments disclosed herein include, but are not limited to, any one or more of magnesium hydroxide, potassium hydroxide, calcium hydroxide, sodium hydroxide, potassium carbonate, and sodium carbonate. In some embodiments, the alkaline material forms a water soluble sulfate upon reaction with sulfuric acid.

In some embodiments, the alkaline material is added to the biotrickling filter manually. For example, an operator may monitor the pH of one of the recirculation water, the treatment water effluent, or water in a sump of the biotrickling filter. When the pH is not within a desired range, or is observed to be approaching a limit of a desired range, makeup water including alkaline material is introduced into the system. When the pH is within the desired range, the makeup water with the alkaline material is not introduced into the system, or is introduced into the system at a reduced rate or a substantially constant rate that has been determined sufficient to maintain the pH within the desired range. The alkaline material may be introduced into the makeup water using a chemical feed pump in fluid communication with a source of the alkaline material and/or by manual adjustment of a flow valve in a conduit fluidly connecting the source of alkaline material to a conduit through which the makeup water flows. In some embodiments, the operator may introduce the alkaline material into the system by introducing the alkaline material into a conduit carrying the recirculation water or directly into the sump of the biotrickling filter.

In other embodiments, the alkaline material is added to the biotrickling filter automatically as needed. In an automatically operating system, a pH probe is located within the system, for example, in the sump of the biotrickling filter or in fluid communication with a conduit carrying the recirculation water or the treatment water effluent. An electronic controller, for example, a programmable logic controller (PLC) receives a signal from the pH probe and compares the pH value to a setpoint or target pH value or to a range of desirable pH values. If the pH is off target, out of the desired range, or approaching a limit of the desired range, the PLC opens a makeup water valve and starts a chemical injection pump or opens an alkaline material flow control valve to introduce makeup water and/or the alkaline material into the biotrickling filter system. Once the pH is within the desired range or at the target pH value, the controller stops the makeup water and alkaline material addition or sets the rate of introduction of the makeup water and/or alkaline material into the system at a rate that has been determined sufficient to maintain the pH within the desired range. This rate may vary according to changes in $H_2S$ loading to the biofilter. In some embodiments, the controller may introduce the alkaline material into the system by introducing the alkaline material into a conduit carrying the recirculation water or directly into the sump of the biotrickling filter.

In various aspects and embodiments disclosed herein, a fuzzy logic controller is used to monitor the pH of the drain water, the recirculation water, the treatment water effluent, or water in a sump of the biotrickling filter and dynamically adjust the flow of make-up water and/or alkaline material to the biotrickling filter to stabilize operating parameters, for example, the pH within the biotrickling filter. The disclosed fuzzy logic controller achieves a more precise and narrow control of pH within a specified range, by, for example, increasing make-up water and/or alkaline material flow during high $H_2S$ loadings, and decreasing or turning off make-up water and/or alkaline material flow during periods of low $H_2S$ loadings. This results in better control of the pH of the biotrickling filter while using significantly less water.

Figure 2A:
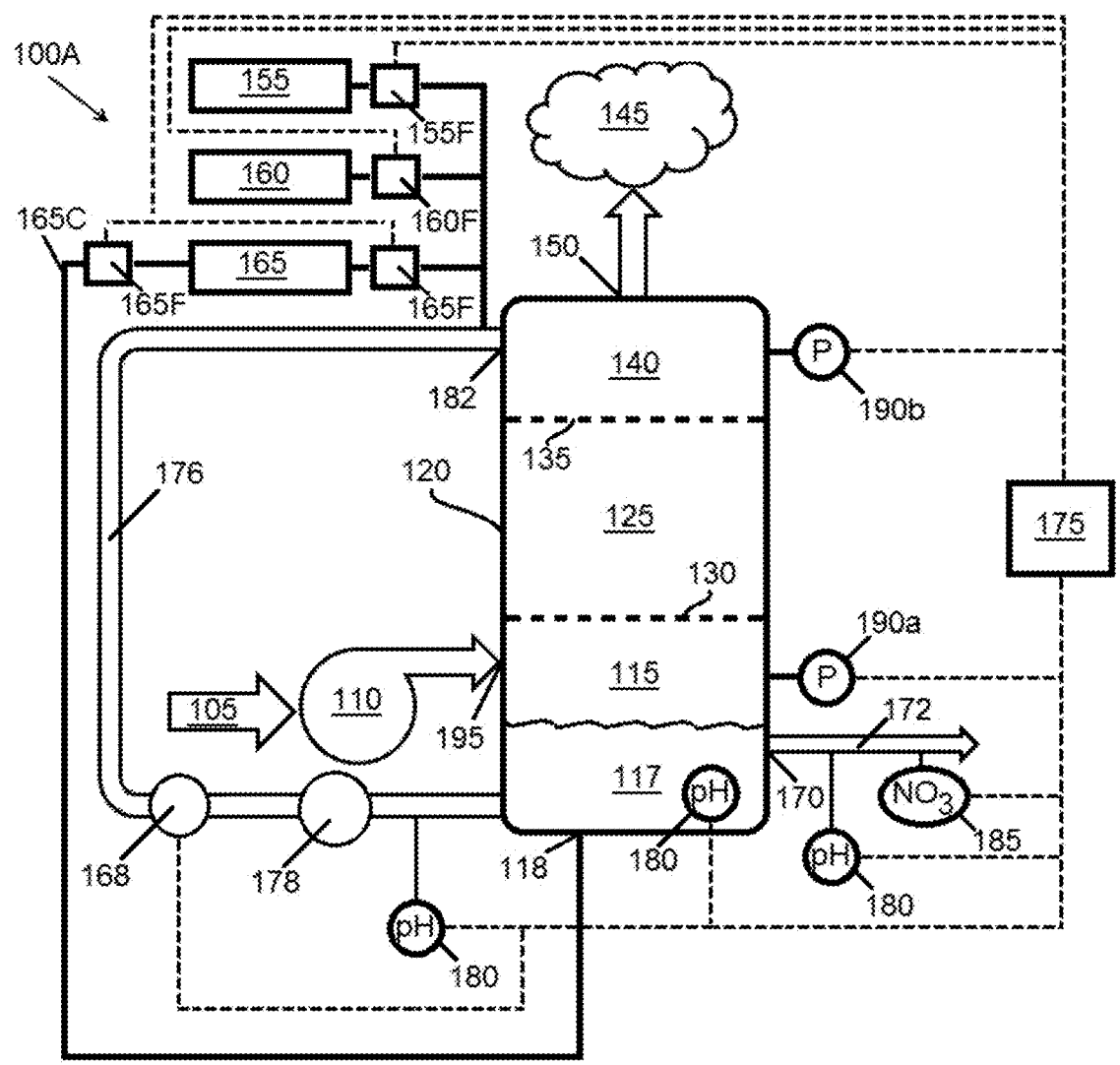
FIG. 2A is a schematic diagram of a biofilter for treating a contaminated air stream.

FIG. 2A illustrates one embodiment of a biofilter, indicated generally at 100, for the treatment of contaminated air. The biofilter (also referred to as a biofiltration system) 100A is supplied with contaminated air 105, for example, air from the headspace of a sewage system or a wastewater treatment system. The contaminated to air 105 contains unwanted or odorous compounds including, for example, hydrogen sulfide. While FIG. 2A is described with reference to hydrogen sulfide, the biofilter 100A may alternatively or additionally be used to mitigate other chemical species. The contaminated air 105 is blown through a blower 110 and through a contaminated air inlet 195 into a lower plenum 115 of a vessel 120 of the biofilter 100A. Alternatively or additionally, the contaminated air 105 may be pulled through the biofilter vessel 120 by a fan or blower located at a treated air outlet 150 of the biofilter vessel 120. The contaminated air passes through the lower plenum 115 and into a media bed compartment 125 of the biofilter 100 that is disposed within the biofilter vessel 120 in fluid communication between the contaminated air inlet 195 and the treated air outlet 150.

The media bed compartment 125 includes a bed of media, for example, particulate media, on which bacteria reside. The media is retained in the media bed compartment 125 by a lower screen 130 and, optionally, an upper screen 135. The contaminated air passing though the media bed compartment 125 contacts the media and the bacteria on the media and in the water in the media bed compartment 125.

The bacteria in the media bed compartment 125 consume hydrogen sulfide in the contaminated air, removing the hydrogen sulfide from the contaminated air and converting the contaminated air into treated air.

The treated air passes through an upper plenum 140 of the biofilter 100A and is released to the external environment 145 or a polishing unit through the upper gas outlet 150 of the biofilter vessel 120. A lower portion of the plenum 115 may function as a sump 117 which may retain fluid draining from the media bed compartment 125. Sulfuric acid produced by the bacteria, water, unutilized nutrients, and other waste fluids exit the sump 117 through either a drain outlet 170 connected to drain line 172 or through an effluent outlet 174 connected to a recycle line 176. Alternatively, a single effluent outlet connected to the sump 117 could deliver liquid both to the drain line and recycle line. The waste fluid in drain line 172 may be returned to a sewage system or wastewater treatment system from which the contaminated air was withdrawn or may be otherwise treated, for example, to neutralize the acid in the waste fluids, or disposed of. The effluent in the recycle line to 176 may be returned to the vessel 120, for example, to the top of the media bed compartment 125, via inlet 182.

The materials of construction of the biofilter vessel 120 are desirably resistant to attack by acid which is generated by the bacteria in the biofilter vessel 120. The walls of the biofilter vessel 120 and the upper and lower screens 130, 135 may be formed from, for example, fiberglass and/or an acid resistant polymer and/or may be coated with an acid resistant material.

Media used in the media bed compartment 125 of the biofilter vessel 120 may be composed of various organic and/or inorganic materials, including, for example, wood mulch, pine bark, gravel, pumice, expanded shale, fired clay, and polymeric open celled foam (referred to hereinafter as "traditional media materials"). The media is referred to synonymously herein as "biofiltering media." The biofiltering media is configured to support growth and maintenance of a population of hydrogen sulfide oxidizing bacteria on the biofiltering media. To support growth and maintenance of a population of hydrogen sulfide oxidizing bacteria, the biofiltering media may be porous or fibrous to provide a large surface area on which the hydrogen sulfide oxidizing bacteria may grow, and may be resistant to degradation by acid and/or non-reactive with acids, for example, sulfuric acid in an operating pH range of the biofilter (in some instances, from about 1.6 to about 2.2).

Glass ($SiO_2$) media, for example, sintered glass media, foamed glass media or other silica based media, may be utilized in place of traditional media materials in biofilters for the removal of odorous compounds, for example, hydrogen sulfide, from contaminated air. The characteristics of embodiments of glass-based biofilter media are discussed in detail in U.S. patent application Ser. No. 14/270,461 and U.S. patent application Ser. No. 14/920,407.

To provide an environment conducive to the maintenance and/or growth of a desirable bacterial population within the biofilter 100, the biofilter may include a water introduction system configured to introduce water from a source of water into the biofilter vessel. Water from a source of make-up water 155 and/or nutrients, for example, nitrogen, potassium, and/or phosphorus compounds from a source of nutrients 160 is introduced into the biofilter vessel 120 through an inlet 182 of the to biofilter vessel 120. In some embodiments, the source of make-up water 155 and/or source of nutrients 160 are external to the biofilter vessel 120. In some embodiments, the nutrients are supplied as an aqueous solution. The liquid entering through inlet 182 may generally be referred to as a treatment liquid.

The source of make-up water 155 and the source of nutrients 160 are illustrated in FIG. 2A as being in fluid communication with the same inlet 182 of the biofilter vessel 120 that is also used to introduce recirculated effluent into the biofilter, but in other embodiments the source of make-up water 155 and the source of nutrients 160 may be fluidly connected to different inlets of the biofilter vessel 120. Upon entering the biofilter vessel 120, the make-up water and/or nutrients are distributed over the top of the media bed in the media bed compartment 125 by, for example, a fluid distributor, sprayer, or sprinkler (not shown). The water and/or nutrients are periodically or, alternatively, continuously provided to the media bed in the media bed compartment 125.

In some embodiments, the biofilter includes an alkaline material introduction system configured to introduce an alkaline material from a source of alkaline material into the biofilter vessel. As illustrated in FIG. 2A, a source of alkaline material 165 is in fluid communication with a conduit 155C fluidly connecting the source of make-up water 155 to the inlet 182 of the biofilter vessel. The source of alkaline material 155 may include, for example, one or more of magnesium hydroxide, potassium hydroxide, calcium hydroxide, sodium hydroxide, potassium carbonate, and sodium carbonate. In some embodiments, the alkaline material is present in the source of alkaline material 165 as a slurry or dissolved in a solvent, for example, water. The alkali material is periodically or, alternatively, continuously provided to the media bed in the media bed compartment 125 to control the pH of fluid in the media bed 125. In some embodiments, the alkali material is distributed over the top of the media bed in the media bed compartment 125 by the same fluid distributor, sprayer, or sprinkler as the make-up water and/or nutrients. In some embodiments, the alkaline material introduction system of the biofilter is configured to introduce the alkaline material into the vessel 120 with the water from the source of water 155. In other embodiments, the alkali material is alternatively or additionally introduced separately into the biofilter, for example, into the sump 117 through conduit 165C and inlet 118, illustrated in FIG. 2A. The alkaline material may thus be indirectly added to the media bed compartment of the biofilter.

In some embodiments, flow control devices 155F, 160F, and 165F may be utilized to control the flow of make-up water, nutrients, and alkaline material, respectively, from the sources of make-up water, nutrients, and alkaline material 155, 160, 165. In some embodiments, one or more of the flow control devices 155F, 160F, and 165F are manually controlled flow valves or pumps. In other embodiments one or more of the flow control devices 155F, 160F, and 165F are flow valves or pumps that are automatically controlled by an electronic control system 175, described below. In other embodiments one or more of the flow control devices 155F, 160F, and 165F include flow meters to measure the flow of make-up water, nutrients, and alkaline material, respectively, through the flow control devices 155F, 160F, and 165F.

A portion of the fluid in the sump 117 of the biofilter vessel 120 may be recycled, for example, from lower fluid outlet 174 through recycle line 176 and pump 178 into an inlet 182 proximate an upper end of the biofilter vessel 120. Residual nutrients remaining in the fluid exiting the media bed 125 are thus re-introduced into the biofilter vessel 120, retaining the bioculture and reducing the need for "fresh" nutrients to be introduced into the biofilter vessel 120 from the source of nutrients 160, reducing operating costs of the biofilter 100A. Acid in the fluid exiting the media bed 125 is also re-introduced into the biofilter vessel 120, which may facilitate maintaining the pH within the media bed 125 and/or biofilter vessel 120 at a desired level. Water and/or nutrients and/or alkaline material from the source of water 155 and/or source of nutrients 160 and/or source of alkaline material 165, respectively, may be introduced into the biofilter vessel 120 the same inlet 182 as the recycled liquid from the sump 117 and may be distributed onto the top of the media bed compartment 125 utilizing a common fluid distributor, sprayer, or sprinkler as the recycled liquid from the sump 117. In some embodiments, the alkaline material introduction system of the biofilter is configured to introduce the alkaline material into the vessel 120 with the recycled liquid from the sump 117 and the sump 117 may to be considered a source of water for the biofilter. Biofilters configured as illustrated in FIG. 2A may be referred to as trickling biofilters or biotrickling filters.

Water and/or nutrients and/or alkaline material from the source of water 155 and/or source of nutrients 160 and/or source of alkaline material 165, may be mixed with effluent in the recycle line 176 and delivered back to the vessel 120 via inlet 182.

The biofilter 100A may be provided with one or more sensors which provide information to the controller 175. The controller 175 analyzes the information from the one or more sensors and adjusts a timing/and or rate of introduction (or more generally, an amount per unit time added to the biofilter) of water and/or nutrients and/or alkaline material from the source of water 155 and/or source of nutrients 160 and/or source of alkaline material 165, respectively, into the biofilter vessel 120 responsive to an analysis of the information. In some embodiments, one of the alkaline material and the water may be added or introduced to the biofilter at a fixed rate and the other of the alkaline material and the water may be added or introduced to the biofilter at an amount per unit time or flow rate controlled by the controller 175. The control of the flow rate of make-up water into biofilters in prior known systems has been performed manually with infrequent adjustments to flow rate of the make-up water. This practice has often led to the problems discussed above. It has been discovered that methods of operation of a biofilter may be improved by using automated fuzzy logic control process that will control the effluent pH, for example, to maintain the effluent pH within a desired range.

In some embodiments, the controller 175 may also control a speed of the blower 110 responsive to an analysis of information provided from one or more sensors associated with the biofilter 100A, for example, one or more sensors may provide information regarding a concentration of $H_2S$ entering and/or exiting the biofilter 100A or a percent of H₂S from contaminated air removed by the biofilter to the controller 175.

The biofilter 100A may include one or more pH sensors (also referred to as "pH probes") 180, positioned downstream of the media bed and configured to measure a pH of liquid having passed through the media bed and to provide an to indication of the pH to the electronic control system. The one or more pH sensors 180 may be positioned in, for example, sump 117 and/or in fluid communication with the drain line 172 and/or on the recycle line 176 or otherwise positioned downstream of the media bed of the biofilter. A nutrient concentration sensor 185 configured to measure a concentration of one or more components of a nutrient supplied to the biofilter 110 may be provided in fluid communication with fluid within and/or drained from the biofilter vessel 120 through either the drain line 172 or the recycle line 176. Sensor 185 is illustrated as coupled to the drain line 172 in FIG. 2A, but in other embodiments may be located or configured to measure parameters of fluid within the media bed 125, lower plenum 115, sump 117, or other portions of the biofilter 100. The pH measured by the pH sensor(s) 180 may be utilized by the controller 175 to control or regulate a flow rate and/or frequency of addition of water from the source of make-up water 155, and/or nutrients from the source of nutrients 160, and/or alkaline material from the source of alkaline material 165 into the biofilter vessel 120. Controlling the flow of make-up water and/or alkaline material may, in turn, aid in controlling the pH within the vessel 120. In some embodiments, the controller 175 is configured to maintain an acidic pH within the biofilter vessel 120. A pH of between about 0 and about 4 in the fluid within the biofilter vessel 120 and/or in the sump 117 may be indicative of a pH level within the media bed conducive for hydrogen sulfide consuming bacteria to grow. More particularly, a pH between about 1.6 and about 2.2 may be desired. According to some embodiments a pH set point of about 2.0 may be desired. The controller 175 may be configured to control the introduction of water and/or alkaline material and/or contaminated air into the biofilter to maintain the pH in the biofilter, for example, in the media bed, within these desired ranges or at about this desired set point.

One or more pH sensors 180 in communication with the controller 175 may be placed at various locations in the system to measure pH. For example, in FIGS. 1A and 1B pH sensor(s) 180 are located in sump 117 and/or in fluid communication with the drain line 172 and/or the recycle line 176.

The controller 175 may control the flow of water and/or alkaline material into the biofilter vessel 120 according to a fuzzy logic algorithm in response to the to measurements of the pH sensor(s) 180 as discussed in greater detail below. However, the controller 175 is not limited to using pH as an input parameter. Nor is the controller 175 limited to controlling the output parameters of water flow and/or alkaline material addition to the biofilter. In some embodiments, the controller 175 may respond to other input parameters, including without limitation, pressure values, hydrogen sulfide concentrations in the air stream, nutrient concentration, and air flow or water flow values. The controller 175 may respond to input from any sensor of the system. Further, the controller 175 may be implemented to control any output parameter of the system, including without limitation, water flow rate of any system stream, air flow rate, nutrient addition rate, and/or alkaline material addition rate.

Another type of sensor that may be used in the system 100A includes one or more flow meters. As discussed above, flow meters may be included in one or more of the fluid flow control devices 155F, 160F, and 165F. Alternatively or additionally, a flow meter 168 may be placed elsewhere, for example, along recycle line 176 to measure the flow rate of recycled effluent from sump 117.

The nutrient concentration measured by the nutrient sensor 185 is utilized by the controller 175 to control a flow rate and/or frequency of the flow of nutrients from the source of nutrients 160 into the biofilter vessel 120. A nutrient concentration or a concentration of a component of nutrient supplied to the biofilter 100A below a lower threshold within the biofilter vessel 120 and/or exiting the drain 170 of the biofilter vessel 120 may be indicative of insufficient nutrients being supplied to the bacteria. A nutrient concentration or a concentration of a component of nutrient supplied to the biofilter 100A above an upper threshold in fluid within the biofilter vessel 120 and/or exiting the drain 170 of the biofilter vessel 120 may be indicative of an excessive amount of nutrients being supplied to the bacteria. The controller 175 may control the flow of nutrients into the biofilter vessel 120 according to a fuzzy logic algorithm in response to the measurements of the nutrient sensor 185, as discussed in greater detail below.

Pressure sensors 190a, 190b provide an indication of the differential pressure across the biofilter vessel 120 and/or media bed compartment 125. A pressure differential exceeding an upper threshold value, for example, between about two to inches (5.1 cm) and about 10 inches (25 cm) of water (four degrees Celsius) (between about 498 Pascal and about 2,491 Pascal) may be indicative of the biofilter vessel 120 and/or media bed compartment 125 being blocked, for example, by contaminants or by over-packing of media in the media bed compartment 125. Responsive to the detection of a pressure differential exceeding an upper threshold, the controller 175 may increase the speed of the blower 110 to maintain an air flow through the biofilter vessel 120 within a desired range and/or may shut down the biofilter 100A and/or provide an indication to an operator that the biofilter 100A may be in need of service. A pressure differential which decreases over time may be indicative of the biofilter vessel 120 and/or media bed compartment 125 exhibiting channeling, for example, due to channels forming through the media bed and/or by poor distribution or mispacking of media in the media bed compartment 125. Responsive to the detection of a drop in the pressure differential, the controller 175 may shut down the biofilter 100A and/or provide an indication to an operator that the biofilter 100A may be in need of service.

In some embodiments, the controller 175 is configured to control a rate of introduction of the alkaline material and a rate of introduction of water into the biotrickling filter to be sufficient to both maintain the pH of the liquid in the biofilter, for example, in the media bed, within a range conducive to maintain a population of hydrogen sulfide oxidizing bacteria in a media bed of the biotrickling filter and to prevent clogging of the media bed, for example, by providing sufficient water to rinse salts which may accumulate in the media bed from the media bed. In some embodiments, water soluble salts (for example, sulfates) may accumulate in the media bed as alkaline material introduced into the biofilter reacts with and neutralizes a portion of the acid (e.g., sulfuric acid) in the media bed. Water introduced into the biofilter may rinse accumulated salts from the media bed before the salts accumulate to a degree which causes significant blockage to flow of air or liquid through the media bed or clogging of the media bed.

Figure 2B:
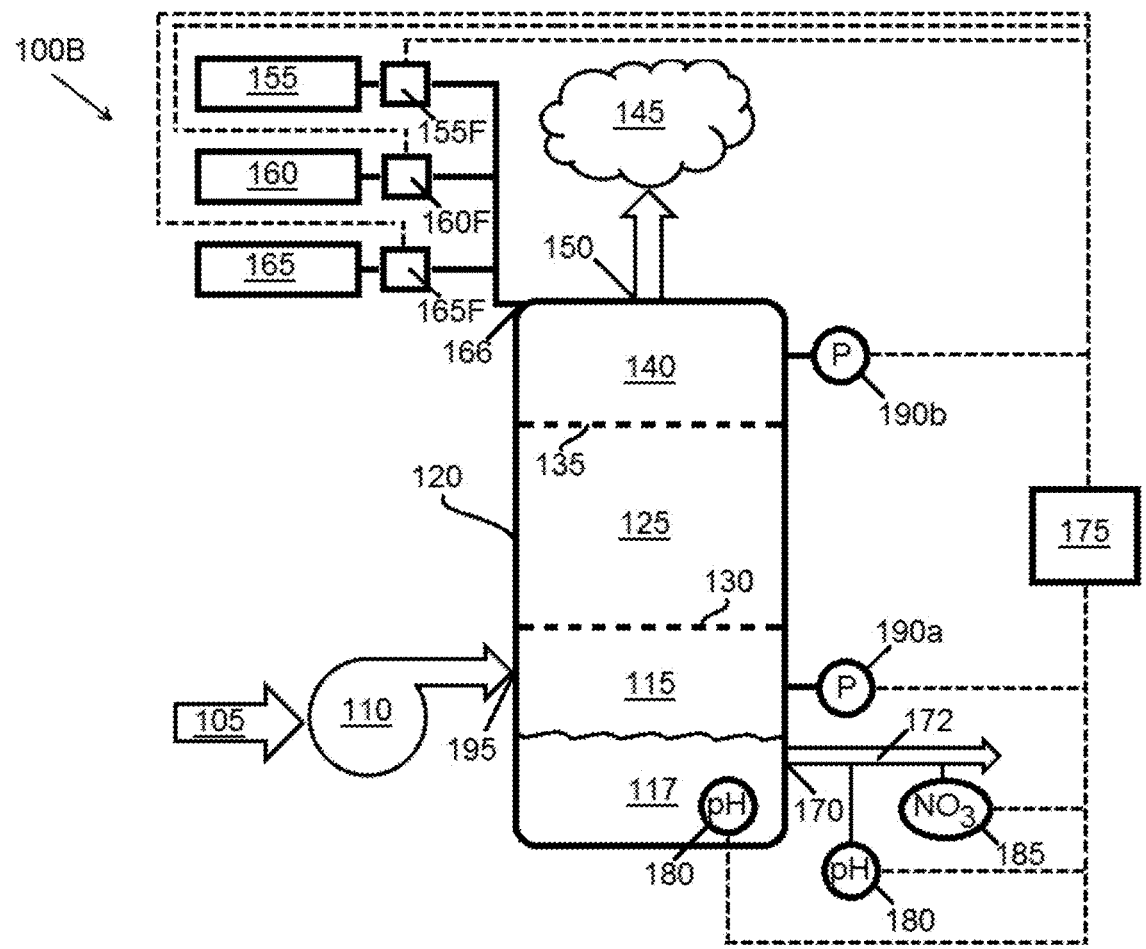
FIG. 2B is a schematic diagram of another biofilter for treating a contaminated air stream.

In some embodiments, as illustrated in the biofilter generally indicated at 100B in FIG. 2B, which is substantially the same as biofilter 100A, the recycle line 176 of FIG. 2A is eliminated, and no fluid from the sump 117 of the biofilter vessel 120 is recycled. Instead, water and/or nutrients and/or alkaline material from the source of water 155 and/or source of nutrients 160 and/or source of alkaline material, respectively, may be introduced into the biofilter vessel 120 through the inlet 166 and may be distributed onto the top of the media bed compartment 125 utilizing a fluid distributor, sprayer, or sprinkler (not shown). The discussion of features and operation of the biofilter and components thereof herein applies equally to both biofilters 100A and 100B.

The controller 175 used for monitoring and controlling operation of the biofilter 100A or 100B may include a computerized control system. Various aspects of the invention may be implemented as specialized software executing in a general-purpose computer system 200 such as that shown in FIG. 3. The computer system 200 may include a processor 202 connected to one or more memory devices 204, such as a disk drive, solid state memory, or other device for storing data. Memory 204 is typically used for storing programs and data during operation of the computer system 200. Components of computer system 200 may be coupled by an interconnection mechanism 206, which may include one or more busses (e.g., between components that are integrated within a same machine) and/or a network (e.g., between components that reside on separate discrete machines). The interconnection mechanism 206 enables communications (e.g., data, instructions) to be exchanged between system components of system 200. Computer system 200 also includes one or more input devices 208, for example, a keyboard, mouse, trackball, microphone, touch screen, and one or more output devices 210, for example, a printing device, display screen, and/or speaker.

The output devices 210 may also comprise valves, pumps, or switches which may be utilized to introduce water and/or nutrients and/or alkaline material from the source of water 155 and/or the source of nutrients 160 and/or the source of alkaline material 165 into the biofilter and/or to control the speed of a blower of the biofilter. One or more sensors 214 may also provide input to the computer system 200. These sensors may include, for example, pH sensor(s) 180, nutrient sensor 185, pressure sensors 190a, 190b, sensors for measuring a concentration of an undesirable component of contaminated and/or treated air, for example, $H_2S$, and/or other sensors useful in a biofilter system. These sensors may be located in any portion of a biofilter system where they would be useful, for example, upstream of a media bed, downstream of a media bed, in communication with a liquid waste outlet of a biofilter vessel, and/or in communication with an air or gas inlet and/or outlet of a biofilter vessel. In addition, computer system 200 may contain one or more interfaces (not shown) that connect computer system 200 to a communication network in addition or as an alternative to the interconnection mechanism 206.

Figure 4:
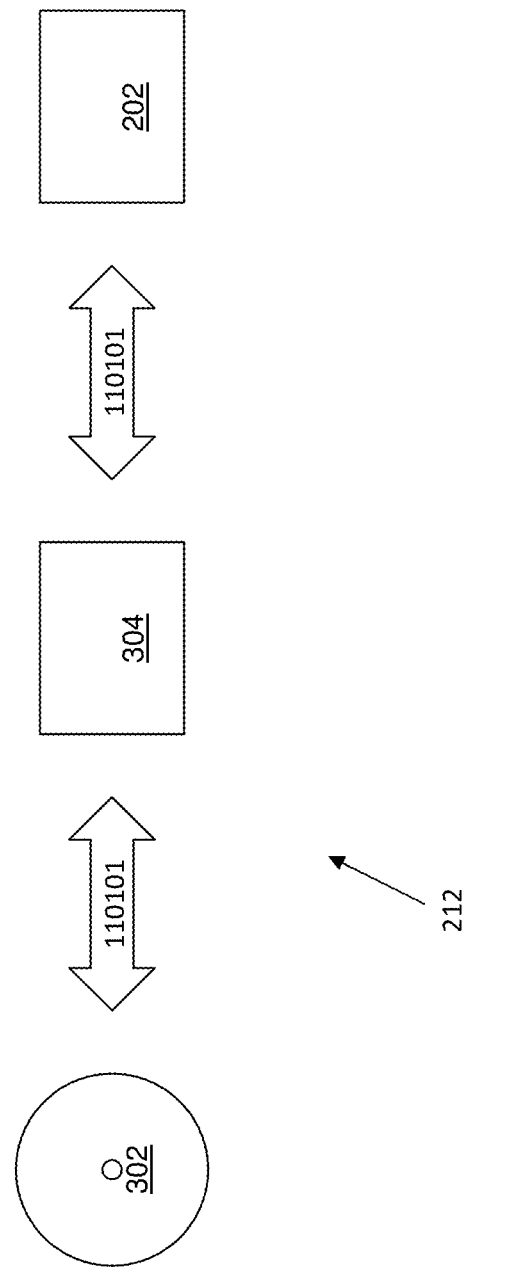
FIG. 4 is a block diagram of a memory system of the computer system of FIG. 3.

The storage system 212, shown in greater detail in FIG. 4, typically includes a computer readable and writeable nonvolatile recording medium 302 in which signals are stored that define a program to be executed by the processor or information to be processed by the program. The medium may include, for example, a disk or flash memory. Typically, in operation, the processor causes data to be read from the nonvolatile recording medium 302 into another memory 304 that allows for faster access to the information by the processor than does the medium 302. This memory 304 is typically a volatile, random access memory such as a dynamic random access memory (DRAM) or static memory (SRAM). It may be located in storage system 212, as shown, or in memory system 204. The processor 202 generally manipulates the data within the integrated circuit memory 204, 304 and then copies the data to the medium 302 after processing is completed. A variety of mechanisms are known for managing data movement between the medium 302 and the integrated circuit memory element 204, 304, and aspects and embodiments disclosed herein are not limited thereto. Aspects and embodiments disclosed herein are not limited to a particular memory system 204 or storage system 212.

The computer system may include specially-programmed, special-purpose hardware, for example, an application-specific integrated circuit (ASIC). Aspects and embodiments disclosed herein may be implemented in software, hardware or firmware, or any combination thereof. Further, such methods, acts, systems, system elements and components thereof may be implemented as part of the computer system described above or as an independent component.

Figure 3:
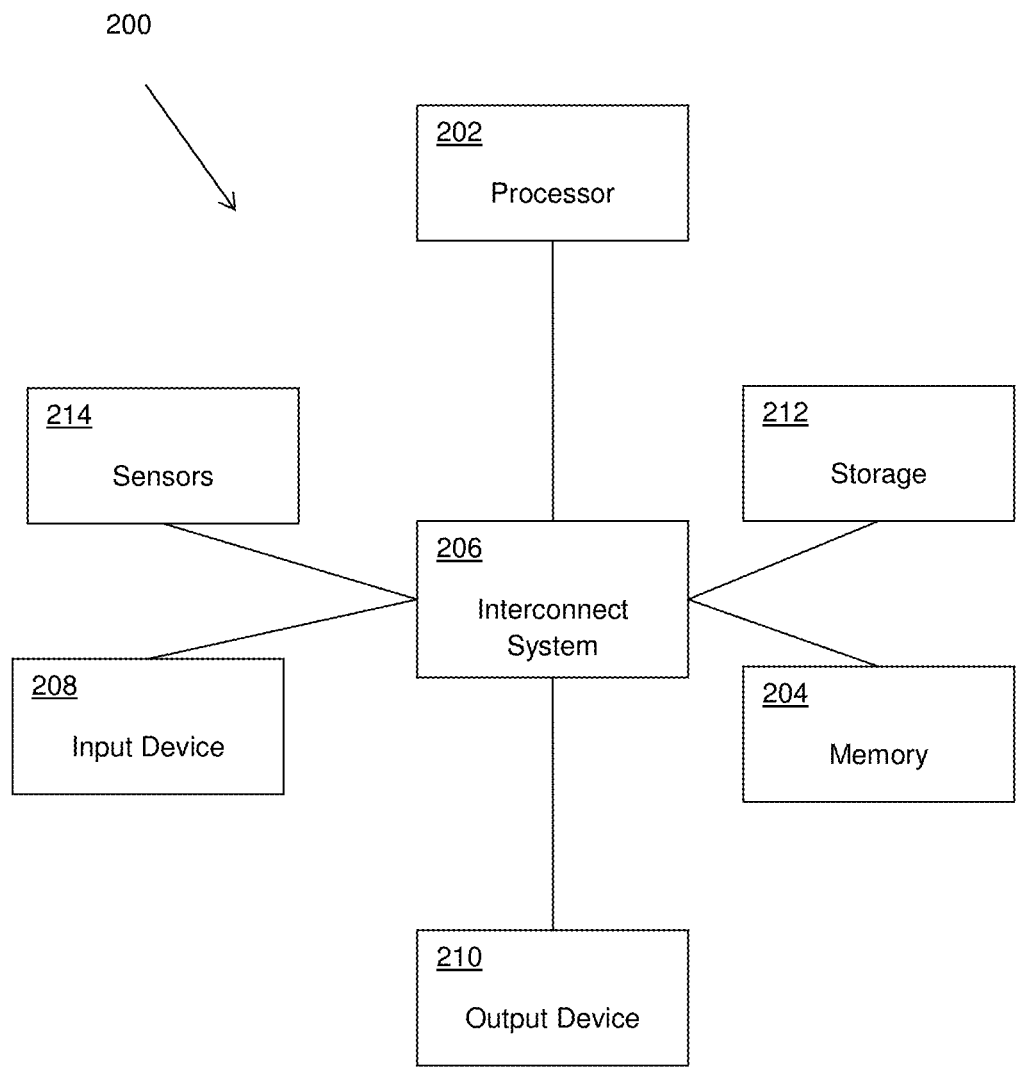
FIG. 3 is a block diagram of a computer system upon which embodiments of a method for treating a contaminated air stream may be performed.

Although computer system 200 is shown by way of example as one type of to computer system upon which various aspects and embodiments disclosed herein may be practiced, it should be appreciated that aspects and embodiments disclosed herein are not limited to being implemented on the computer system as shown in FIG. 3. Various aspects and embodiments disclosed herein may be practiced on one or more computers having a different architecture or components that that shown in FIG. 3.

Computer system 200 may be a general-purpose computer system that is programmable using a high-level computer programming language. Computer system 200 may be also implemented using specially programmed, special purpose hardware. In computer system 200, processor 202 is typically a commercially available processor such as the well-known Pentium™ or Core™ class processors available from the Intel Corporation. Many other processors are available, including programmable logic controllers. Such a processor usually executes an operating system which may be, for example, the Windows 7, Windows 8, or Windows 10 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that aspects and embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects and embodiments disclosed herein may be performed on a client-server system that includes components distributed among one or more server systems that perform various functions according to various aspects and embodiments disclosed herein. These components may be executable, intermediate (e.g., IL) or interpreted (e.g., Java) code which communicate over a communication network (e.g., the Internet) using a communication protocol (e.g., TCP/IP). In some embodiments one or more components of the computer system 200 may communicate with one or more other components over a wireless network, including, for example, a cellular telephone network.

It should be appreciated that the aspects and embodiments disclosed herein are not limited to executing on any particular system or group of systems. Also, it should be appreciated that the aspects and embodiments disclosed herein are not limited to any particular distributed architecture, network, or communication protocol. Various aspects and embodiments disclosed herein are may be programmed using an object-oriented programming language, such as SmallTalk, Java, C++, Ada, or C # (C-Sharp). Other object-oriented programming languages may also be used.

Alternatively, functional, scripting, and/or logical programming languages may be used, for example ladder logic. Various aspects and embodiments disclosed herein are may be implemented in a non-programmed environment (e.g., documents created in HTML, XML or other format that, when viewed in a window of a browser program, render aspects of a graphical-user interface (GUI) or perform other functions). Various aspects and embodiments disclosed herein may be implemented as programmed or non-programmed elements, or any combination thereof.

The controller may be operated under a "fuzzy logic" regime. Fuzzy logic is a problem-solving control system methodology that lends itself to implementation in systems ranging from simple, small, embedded micro-controllers to large, networked, multi-channel PC or workstation-based data acquisition and control systems. It can be implemented in hardware, software, or a combination of both. Fuzzy logic provides a way to arrive at a definite conclusion based upon vague, ambiguous, imprecise, noisy, or missing input information. A fuzzy logic approach to control to problems mimics how a person would make decisions, only much faster.

In a standard bivalent set theory, an object cannot belong to both a set and its complement. When describing temperature, for example, using sets such as "hot" and "cold" a certain temperature value either belongs to the "cold" set or the "hot" set, and never both at the same time. The boundaries of standard sets are exact. However, standard bivalent set theory is not descriptive of the real world. In the real world boundaries in sets are not exact and often blur together. Objects can belong to many sets to varying degrees. By using fuzzy logic one can build devices capable of reasoning with fuzzy sets and judge how they should operate or shift from one setting to another even when the criteria for making those changes are hard to define.

In a fuzzy logic algorithm, a crisp input value is first converted to fuzzy sets in a process called "fuzzification." The algorithm then uses rules to associate these fuzzy input sets to fuzzy output sets representing some control value, for example, motor speed or fluid flow rate.

Fuzzy logic incorporates a rule-based IF X AND Y THEN Z approach to solving a control problem rather than attempting to model a system mathematically. The fuzzy logic model is empirically-based, relying on an operator's experience rather than their technical understanding of the system. For example, rather than dealing with pH control in terms such as "Set_Point=2.0", "pH<1.6", or "pH 1.6<pH<2.2", terms like "IF (process is too acidic) AND (process is getting more acidic) THEN (increase water flow rate to the process)," "IF (process is too basic) AND (process is getting more basic rapidly) THEN (reduce the water flow rate to the process quickly)," "IF (process is too acidic) AND (process is getting more acidic) THEN (increase addition of alkaline material to the process)," or "IF (process is too basic) AND (process is getting more basic rapidly) THEN (reduce the addition of alkaline material to the process quickly)" are used. These terms are imprecise and yet very descriptive of what desirably should happen.

Fuzzy logic controllers are typically provided with some numerical parameters to facilitate operation, for example, what is considered significant error and significant rate-of-change-of-error. Exact values of these numerical parameters are usually not critical unless very responsive performance is required in which case empirical tuning to would determine them. For example, a pH control system could use a single pH feedback sensor whose data is subtracted from the command signal to compute "error" (a degree of deviation of measured pH from a desired center point of a range of pH values) and then time-differentiated to yield the error slope or rate-of-change-of-error, hereafter called "error-dot." Error might have units of pH and a small error may be considered to be about 0.1 pH units while a large error might be about 0.5 pH units. The "error-dot" might then have units of pH units/min with a small error-dot being about 0.2 pH units/min and a large one being about 1.0 pH units/min. These values do not have to be symmetrical and can be altered once the system is operating to improve or optimize performance. Generally, fuzzy logic is inherently robust since it does not require precise, noise-free inputs and can be programmed to fail safely if a feedback sensor quits or is destroyed. The output control is a smooth control function despite a wide range of input variations. Since the fuzzy logic controller processes user-defined rules governing the target control system, it can be modified to improve or alter system performance. New sensors can easily be incorporated into the system simply by generating appropriate governing rules.

In one embodiment, a fuzzy logic controller 175 is interfaced with a biofilter 100. The system comprises a pH monitoring device 180 in contact with the effluent of the biofilter 117. Flow meters are positioned to measure the flow of make-up water from source of make-up water 160 and/or a rate of addition of alkaline material from source of alkaline material 165. A flow meter may additionally or alternatively be placed along recycle line 176. Flow control devices 155F and/or 165F are positioned, for example, downstream of the source of make-up water 155 and/or the source of alkaline material 165 to regulate flow of make-up water and/or alkaline material into recycle line 176 or into the biofilter vessel 120 through inlet 182, 166, and/or 118. The flow control device 155F and/or 165F may comprise, for example, an automated control valve such as a motorized valve, a solenoid valve, or a pneumatic valve. The flow control device 155F and/or 165F is interfaced with the fuzzy logic controller 175. The pH monitoring device(s) 180 may measure the pH of effluent at one or more points in the system 100, for example, in the sump 117. The controller 175 receives the pH value via an input signal from the pH sensor(s) 180. Based on a pre-determined set point, the controller 175 sends a signal to the flow control device 155F and/or 165F that either causes the make-up water and/or alkaline material flow rate to increase or decrease depending on the pH of the effluent, or causes the flow rate of the recycled effluent in recycle line 176 to increase or decrease, according to an alternative embodiment. In some embodiments, the controller utilizes an indication of pH from the pH sensor(s) 180 as an input parameter in an algorithm used by the fuzzy logic-based controller to automatically control one of the amount of water introduced to the biotrickling filter per unit of time and/or the amount of the alkaline material added to the biotrickling filter per unit of time.

The following examples are given by way of illustration of working one embodiment in actual practice and should not be construed to limit the scope of the presently disclosed aspect and embodiments in any way.

Example 1: Fuzzy Logic Control Scheme

A non-limiting example of a fuzzy logic control scheme for controlling the pH in a trickling biofilter is described as follows. This control scheme is designed to maintain a pH in a biotrickling filter system within a range of +/−0.4 pH units of a set point of 2.0 pH units by adjusting the flow rate of fresh make-up water into the biofilter using a motorized controller actuated valve. Advantages of using a fuzzy logic control scheme in this setting include:
1. pH behavior is non-linear. Using a fuzzy system circumvents mathematical modeling of the pH behavior of the system.
2. The pH target set point and the allowable threshold of variation can remain as variables in the control logic.

The algorithm of the controller receives two crisp inputs, error and error-dot. Crisp inputs maybe defined herein as actual measured inputs having defined values. Error is calculated by subtracting a measured pH (also referred to as a feedback pH) from the user programmed pH set point. Error-dot is calculated as the change in error over a time period. From these two inputs the algorithm calculates an output control value. In this particular implementation, the output control value corresponds to a change in the position of a motorized control valve on a flow control valve that to controls the flow rate of the make-up water and/or alkaline material into the biofilter. Finally, based on the output control value, the controller sends an output signal to the control valve and the flow rate of make-up water and/or alkaline material is adjusted accordingly. The algorithm waits for a defined period of time for the changes in the flow of make-up water and/or alkaline material to be reflected in the system pH, and after this period of time, the algorithm repeats this procedure.

Error, which is the first of the two crisp input variables, is defined as the difference between target pH and measured, or feedback, pH, and may be calculated according to the following equation:

$$\text{Error} = \text{target pH} - \text{feedback pH}.$$

Having obtained the pH measurement and calculated the error, the controller algorithm places the error in one or more fuzzy sets shown in TABLE 1.

TABLE 1

| Fuzzy Error Sets | | |
| --- | --- | --- |
| Set Name | Error Type | Description |
| pH_Low | positive error | Measured pH is lower than target |
| pH_High | negative error | Measured pH is higher than target |
| pH_Good | zero error | Measured pH is same as target |

A characteristic of fuzzy set theory is that the error value need not belong to only one set but may be a member of multiple sets to differing degrees. Membership functions are used to determine the degree to which the calculated error is a member of each of the error sets. Using error as an example, there are three sets that input "error" can belong to: pH_Low, pH_High, and pH_Good. Membership functions define which fuzzy sets a given input belongs to, and the degree to which it belongs to that particular set (degree of membership).

Figure 5:
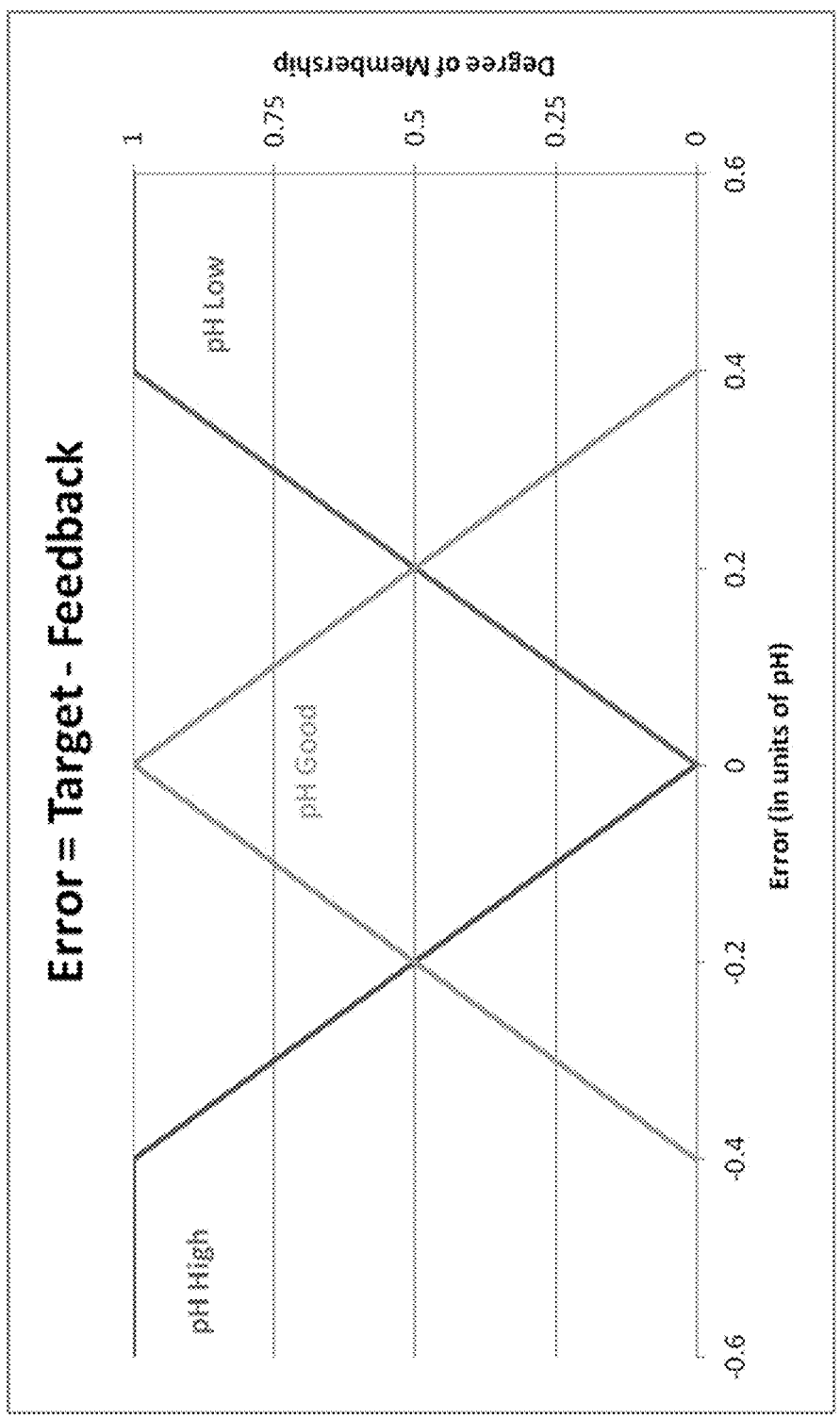
FIG. 5 is a chart relating error with a degree of membership in one or more fuzzy input sets.

FIG. 5 depicts a graph showing the relationship between error and the degree of membership in a fuzzy set. For this example, the predetermined desired pH range is plus/minus 0.4 pH units from the pH set point. Where error is zero, the error belongs one hundred percent in the pH_Good set. Where the error is +0.4 pH or greater, the error belongs one hundred percent in the pH_Low set. (Referring to to Equation 1, error is defined as target pH minus measured pH, therefore if the measured pH is below the set point, the error will be positive.) Where the error is −0.4 pH or more negative, the error belongs one hundred percent in the pH_High set. Where the error is 0.0 pH, the error belongs one hundred percent in the pH_Good set.

Where the error is between 0.0 pH and +0.4 pH, the error will be a member of both the pH_Good set and the pH_Low set. The percent membership in the pH_Good set decreases linearly from 100% where error is 0.0 pH to 0% where error is +0.4 pH. Meanwhile, the percent membership in the pH_Low set increases linearly from 0% where error is 0.0 pH units to 100% where error is +0.4 pH units. Analogous relationships apply between the pH_Good set and the pH_High set where error is between −0.4 pH units and 0.0 pH units.

Error-dot, which is the second of the two crisp input variables, is defined as the change in error over a predetermined time period, and may be calculated according to the following equation:

$$\text{Error-dot} = d\,\text{Error}/dt$$

The error-dot may belong in three different fuzzy sets shown in TABLE 2:

TABLE 2

| Fuzzy Error-Dot Sets | | |
| --- | --- | --- |
| Set Name | Error Type | Description |
| pH_getting_lower | positive error-dot | Error is changing with positive slope |
| pH_getting_higher | negative error-dot | Error is changing with negative slope |
| pH_no_change | zero error-dot | Error is not changing |

Figure 6:
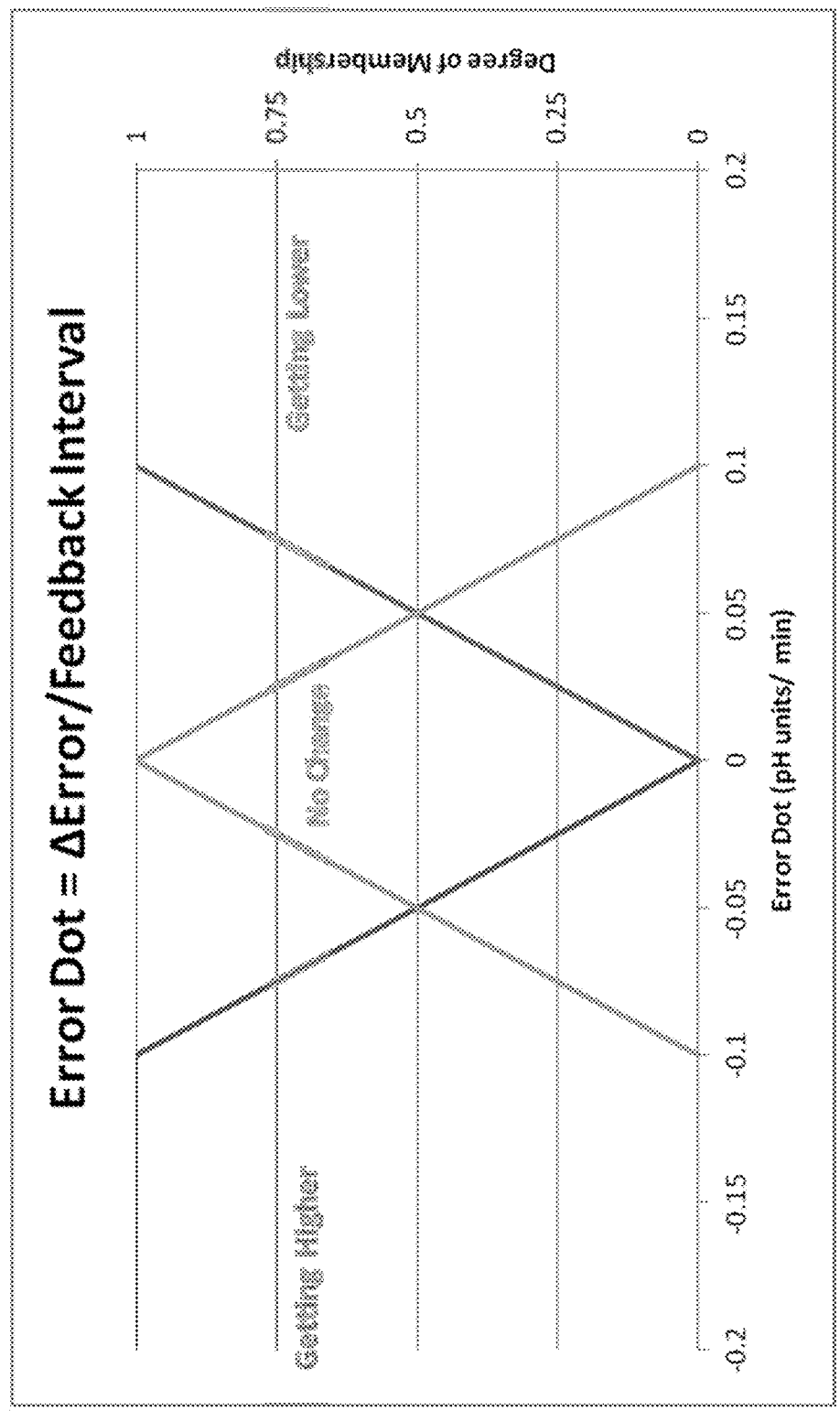
FIG. 6 is a chart relating error-dot with a degree of membership in one or more fuzzy input sets.

FIG. 6 depicts a graph showing the relationship between error-dot and the degree of membership in a fuzzy error dot set. For this example, the pre-determined desired range for error-dot is plus/minus 0.1 delta pH units/minute.

Where the error-dot parameter is +0.1 d error/min or greater, the error-dot parameter belongs one hundred percent in the pH_getting_lower set. Where the error-dot is −0.1 d error/min or more negative, the error-dot parameter belongs one hundred percent in the pH_getting_higher set. Where the error-dot is 0.0 d error/min, the to error-dot parameter belongs one hundred percent in the pH_no_change set.

Where the error is between 0.0 d error/min and +0.1 d error/min, the error will be a member of both the pH_no_change set and the pH_getting_lower set. The percent membership in the pH_no_change set decreases linearly from 100% where error is 0.0 d error/min to 0% where error is +0.1 d error/min Meanwhile, the percent membership in the pH_getting_lower set increases linearly from 0% where error dot is 0.0 d error/min to 100% where error dot is +0.1 d error/min Analogous relationships apply between the pH_no_change set and the pH_getting_higher set where error dot is between −0.1 d error/min and 0.0 d error/min.

Thus far the controller has received crisp input signals describing pH values of the effluent. The controller used these crisp inputs to calculate error and error dot and determined degrees of membership in the various fuzzy error sets and fuzzy error dot sets based on the inputs and pre-determined ranges. Now that the degrees of membership have been determined, the controller may use this information to determine an output control value.

The output control value determines the output signal delivered to the control valves. Change in control valve positions may be calculated as a percentage of total valve span from 0% to +1-100%. A positive percentage represents opening of the valve, and a negative percentage representing a closing of the valve. This percentage is converted to a milliamp change in valve position. For a 4-20 milliamp (mA) actuated valve the total span of movement of the valve is 16 mA, therefore the controller adjusts the current valve position by changing the applied current as a percentage of 16 mA.

A series of steps are performed in the controller algorithm to arrive at an output control value based on the input values. The fuzzy logic controller incorporates a rule-based IF X AND Y THEN Z approach to determining the output to control value, rather than relying on a mathematical model of the system, the way other control processes do. The controller uses this rule-based approach to associate input signals with specific output actions.

For this system, there are five fuzzy output sets. Each fuzzy output set has a rule associating it with one or more fuzzy input sets.

Because this system includes five fuzzy output sets, it has five rules, shown in TABLE 3:

TABLE 3

Rules

| Input Fuzzy Set Antecedent condition. If . . . | Output Set Consequent Action. Then . . . |
|---|---|
| pH_Good | Do_Nothing |
| pH_High | Close_fast |
| pH_Low | Open_fast |
| pH_Good AND getting_lower | Open_slow |
| pH_Good AND getting_higher | Close_slow |

Each fuzzy output set is associated with a numerical output value constant. For example, the output set Open_fast is associated with the constant 1.0, which indicates that the output set is associated with opening an associated valve 100%. The output set Do_Nothing is associated with the output set constant, 0, indicating that it corresponds to an output of a 0% change in the valve position. The output set Close_slow is associated with an output in which the valve is closed 50% from its current position. Each of the associated output constants is shown in Table 4.

TABLE 4

Output Set Constants

| Fuzzy Output Set | Associated Fuzzy Output Set Constant |
|---|---|
| Open_valve_fast; | 1.0 |
| Open_valve_slow | 0.5 |
| Do_nothing | 0.0 |
| Close_valve_slow | −0.5 |
| Close_valve_fast | −1.0 |

While there are five fuzzy output sets, ultimately, a single crisp output control signal for controlling the valve must be determined.

This single crisp output signal is determined by calculating a degree of membership for each fuzzy output set and then taking a weighted average of the fuzzy output set constants. The degree of membership in the fuzzy output set serves as the weighting coefficient.

The degree of membership in each respective fuzzy output set is a function of the degree of membership of the input sets that serve as conditions for the output set.

For example, the rule associated with the Do_nothing output set is:

IF pH Good THEN Do_nothing.

This output results from an input designating that pH error parameter is in a good range. Therefore the degree of membership in the output set Do_nothing is a function of the degree of membership of the fuzzy input set pH_Good.

The logical operations shown in TABLE 5 below are evaluated to determine a degree of membership (and therefore a weighting coefficient) for each of the five fuzzy output sets based on the rule statements. In TABLE 5, "x" corresponds to an error parameter membership value and "y" corresponds to an error-dot parameter membership value.

TABLE 5

Logical Operations

| Logical Operation | Membership Value |
|---|---|
| x AND y (Intersect) | min(x, y) |
| x OR y (Union) | max(x, y) |
| NOT x (Compliment) | 1 − x |

Combining the logical operations shown in TABLE 5 with each associated rule provides the equation for determining the output membership.

For example, the rule governing the Open_slow output set is:

IF pH Good AND Getting_Lower THEN Open_slow.

Because the Open_slow output requires two antecedent conditions, the intersect operation must be performed to determine the degree of membership for the Open_slow output set as follows:

Open_slow degree of membership=min(pH_good membership, Getting_lower membership).

An analogous operation is performed on each of the five output sets.

Once the degree of membership for each fuzzy output set is determined, a weighted average of the fuzzy output set constants is taken, and the result is the output control value. The output control value represents a percentage by with the valve(s) will be opened or closed from its present position. After a predetermined amount of time passes, the process is repeated and a new valve position is determined. The period of time may be determined by a determination of how long it would take a change in make-up water flow and/or alkaline material addition to the biofilter to case a steady pH in biofilter to be re-established.

Applying specific values for illustrative purposes, if Feedback pH=1.8, and Target pH=2.0, then Error=Target−Feedback=2.0−1.8=+0.2 pH.

This error value would have the following degrees of membership in the fuzzy error sets:
Membership(pH_high)=0;
Membership(pH_good)=0.5; and
Membership(pH_low)=0.5.

If four minutes earlier the pH reading had been 1.6, then d error/dt=Error-dot=(−0.4−−0.2)/4=−0.05. This error-dot value would have the following degrees of membership:
Membership(Getting_higher)=0.5;
Membership(No_change)=0.5; and
Membership(Getting_lower)=0.

TABLE 6 shows the weighting values for each output set determined from the intersect, union and complement operations found in the rule base evaluated using the corresponding input set degree membership.

TABLE 6

Degrees of Membership in Output Sets

| Rule | Evaluate to find a weighting value for the output set | Degree of Membership (Weighting Value) |
|---|---|---|
| IF pH_Good THEN Do_nothing | MAX (0.5, N/A) | 0.5 |
| IF pH_High THEN Close_fast | MAX (0, N/A) | 0.0 |
| IF pH_Low THEN Open_fast | MAX (0.5, N/A | 0.5 |
| IF pH_Good AND Getting_Lower THEN Open_slow | MIN (0.5, 0) | 0.0 |
| IF pH_Good AND Getting_Higher THEN Close_slow | MIN (0.5, 0.5) | 0.5 |

Evaluating the rule for Do_nothing, the membership value of pH_Good is 0.5, therefore the weighting value for the fuzzy output set of Do_nothing is 0.5.

Evaluating the rule for Close_fast, the membership value of pH_High is zero, therefore the scaling or weighting coefficient for the fuzzy output set of Close_Fast is zero.

Evaluating the rule for Open_fast, the membership value of pH_Low is 0.5, therefore the weighting coefficient for the fuzzy output set of Open_fast is 0.5.

Evaluating the rule for Open_Slow, the membership value for pH_Good is 0.5, while the membership value for Getting_Lower is 0.0. Taking the minimum of these two values, the weighting coefficient for Open_Slow is 0.0.

Evaluating the rule for Close_Slow, the membership value for pH_Good is 0.5, while the membership value for Getting_Higher is also 0.5. Taking the minimum of these two values, the weighting coefficient for Close_Slow is 0.5.

Once the algorithm finds the weighting coefficient of each fuzzy output set by evaluating the rules in the rule base, each fuzzy output set is scaled according to the weight of its corresponding rule. For example, the rule corresponding to the fuzzy output set "do nothing" evaluated to 0.5, so this fuzzy set is scaled to 50%. Once all fuzzy output sets are scaled appropriately, the algorithm calculates the centroid, or center of mass, or the weighted average of output set constants, according to the equation:

$$\frac{\sum_{i=1}^{5} C_i * M_i}{5}$$

where,
i=fuzzy output set;
C=output set constant; and
M=degree of membership.

The sum is divided by the number of output sets, which is five in this case.

Application of the above equation to the given values for this scenario results in an output value of 0.167.

With a low pH of 1.8 (target of pH 2.0) with the pH rising at a rate of 0.05 pH/min, the algorithm therefore responds by opening the valve(s) from present position(s) by 16.7% of the total valve capacity or span range to increase make-up water flow and/or alkaline material addition and raise the pH within the biofilter. The logic takes into consideration both the current state of the system (pH is low) and the behavior of the system (pH is getting higher) to calculate a suitable blended control value for the valve position(s).

Total valve capacity is span range: 20 mA-4 ma=16 mA. Therefore valve position is increased by:

+16 mA*0.167=+2.672 mA (a crisp output value of the algorithm)

The controller reads the current presently applied to the valve and adds an additional 2.672 mA to further open the valve.

Figure 7:
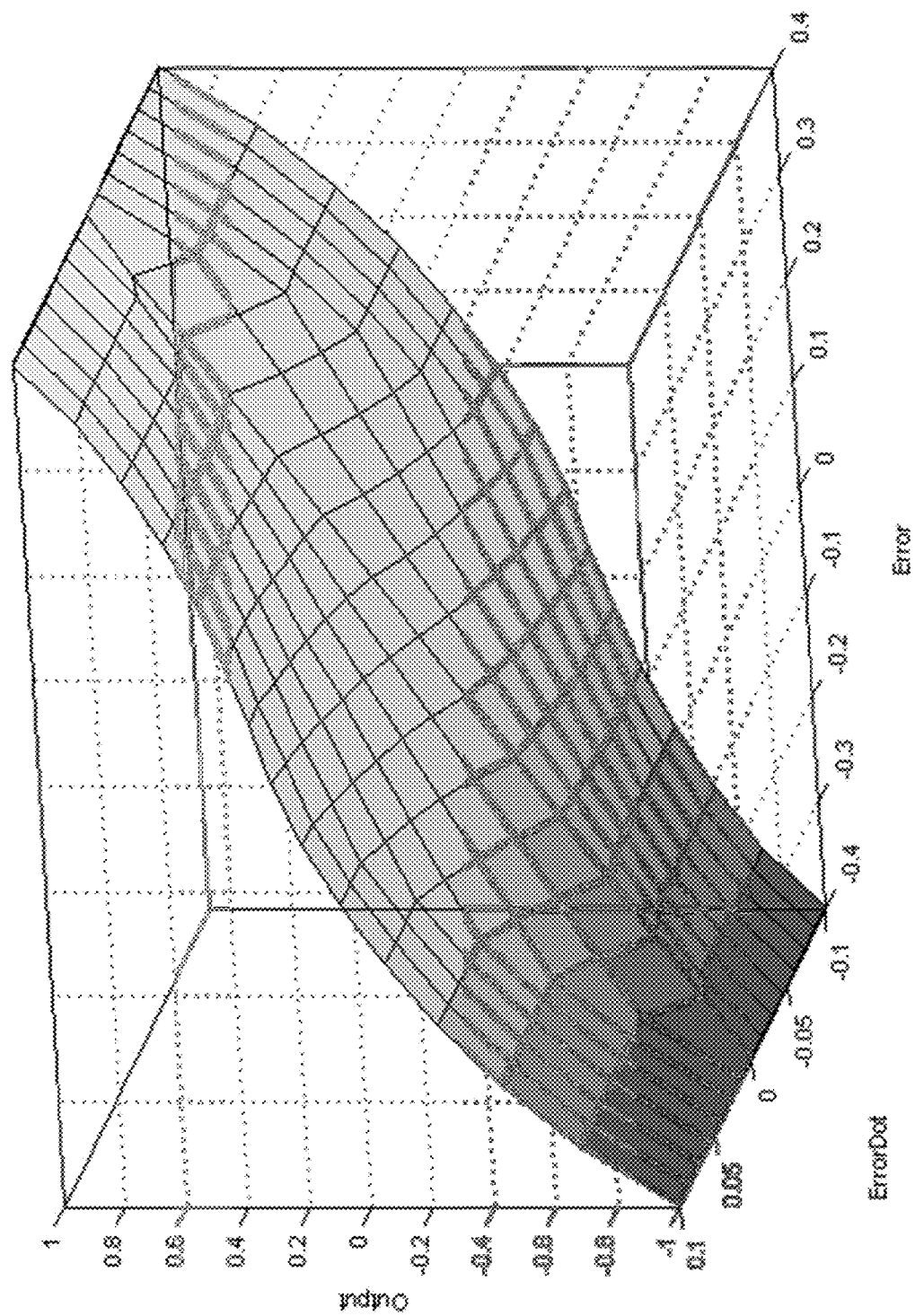
FIG. 7 is a surface map of the output control value for all combinations of error and error-dot for an embodiment of a biofilter as disclosed herein.

In instances where a full open position of the valve corresponds to an input current of 20 mA, limits are set in the programming so that final valve position is not set higher than 20 mA. When the valve is already opened to its fullest extent in the 20 mA position but the maximum flow rate of water and/or alkaline material through the valve(s) is not sufficient in raising the feedback pH to the target, the algorithm may recommend the valve position(s) be increased by a value that comes out of the fuzzy logic process, but the actual position(s) of the valve(s) will remain unchanged. FIG. 7 shows the resultant "surface" of the output for all combinations of error and error-dot in the defined range, based on the rules described above. As shown in FIG. 7, the output control value is a function of both the error value and the dot error value.

Example 2: Test of Effectiveness of Alkali Addition for Maintaining Biofilter pH Alkaline material has not been utilized in the past for neutralizing portions of acid within biofilters or biotrickling filters for a number of reasons. One of these reasons was a concern that the addition of alkaline material to the media bed of a biofilter including $H_2S$ oxidizing bacteria could negatively affect the health of the bacterial population, killing or otherwise deactivating a portion of the bacterial population and thus decreasing the ability of the bacteria to remove $H_2S$ or other undesirable compounds from a contaminated air stream. Accordingly, testing was performed to determine if the pH of fluid within and/or exiting a biofilter could be controlled by the addition of alkaline material to the biofilter media bed (and a reduction in make-up water addition) without negatively impacting the performance of the biofilter.

Testing was performed in early summer using a 3-stage 3.7 m (12 ft) diameter biotrickling filter (BTF) in Florida, using 50% caustic soda (sodium hydroxide) as the alkaline material in conjunction with a pH control system. Initial water usage at the to site was 17 gpm on average. After addition of caustic soda and utilizing pH control, the water usage dropped to an average of 5 gpm, a 60% reduction, while maintaining previous levels of hydrogen sulfide removal.

Testing was conducted over the course of about 5 days (about 120 hours). For the first 74 hours the system was operated at the maximum site-available make-up water rate of roughly 16.9 gpm. From hour 74 to hour 103 the system was operated with addition of 50% caustic soda (sodium hydroxide) fed at a rate of 30 gallons per day (78 mL/min) into the sump of the biofilter. The rate of make-up water was controlled using an actuated globe valve and a fuzzy logic controller attempting to maintain a pH in the sump of the biotrickling filter at 1.72. From hour 103 until the end of testing caustic addition was terminated, but the fuzzy logic controller was allowed to continue to adjust make-up water addition as necessary in attempt to maintain the pH 1.72 set point.

Prior to addition of caustic the site available water rate of 16.9 gpm was insufficient to achieve a pH of 1.72, as illustrated in FIG. 7.

Figure 9:
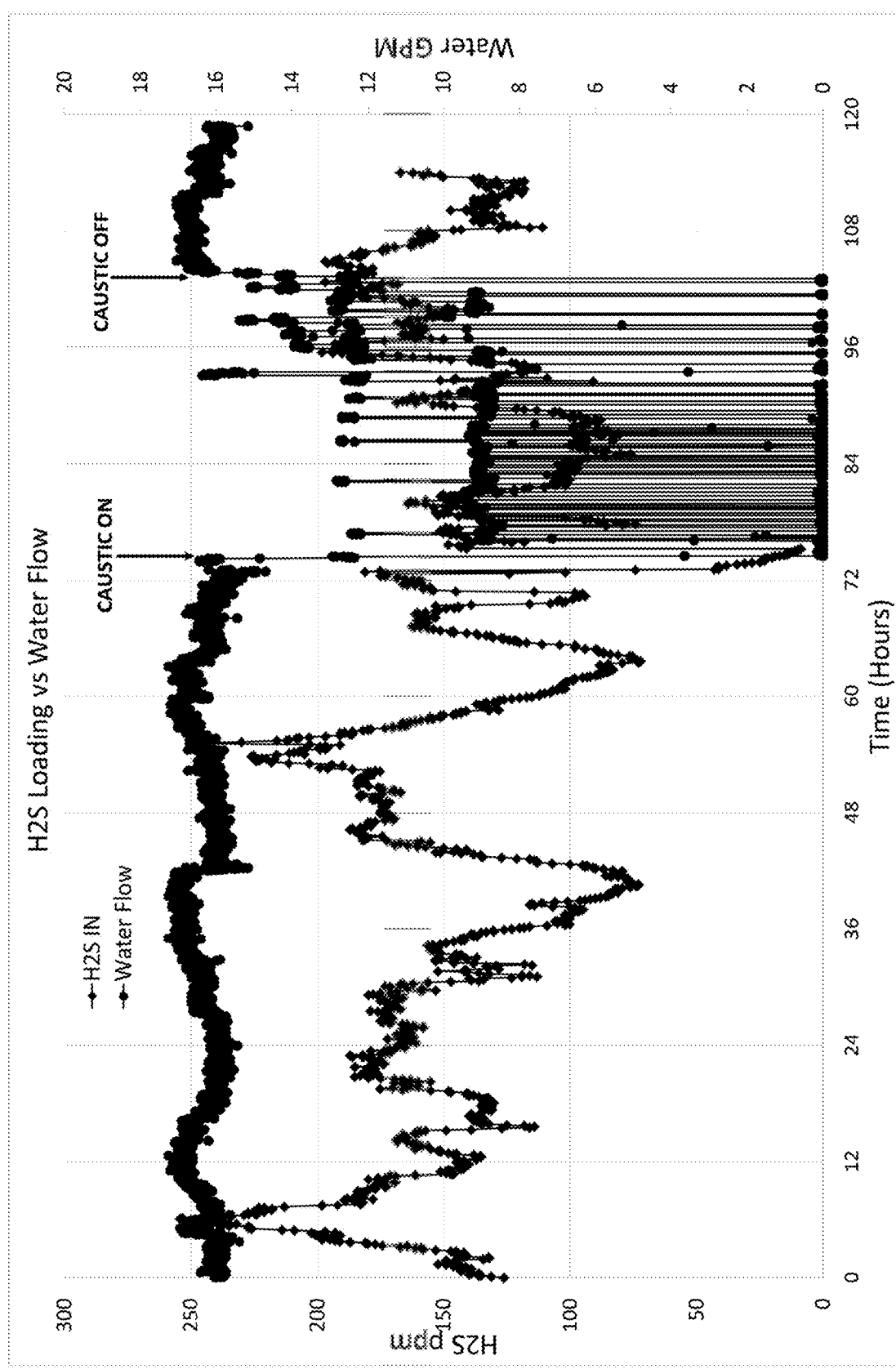
FIG. 9 is another chart of data obtained during testing of an embodiment of a biofilter as disclosed herein.

Make-up water rate during the pre-caustic period averaged 16.3 gpm. The average pH was 1.61 with a high of 1.70 and a low of 1.56. Average $H_2S$ loadings were 150 ppm. At hour 74, caustic addition was initiated and the system was placed in automatic pH control. This allowed an actuated globe valve to throttle water in response to changing pH in attempt to keep pH within a user specified set-point range. Water usage dropped to 4.96 gpm and pH was maintained at an average value of 1.73 with a low of 1.70 and a high of 1.78. Average $H_2S$ loadings were 130 ppm, slightly lower than the pre-caustic levels of 150 ppm, but comparable. It was important to establish that loadings were comparable during these two periods so that the reduction in water usage can be attributed primarily to the caustic addition and pH control and not a drop in $H_2S$ loading. A chart of $H_2S$ loading and water flow rate is shown in FIG. 9.

Figure 8:
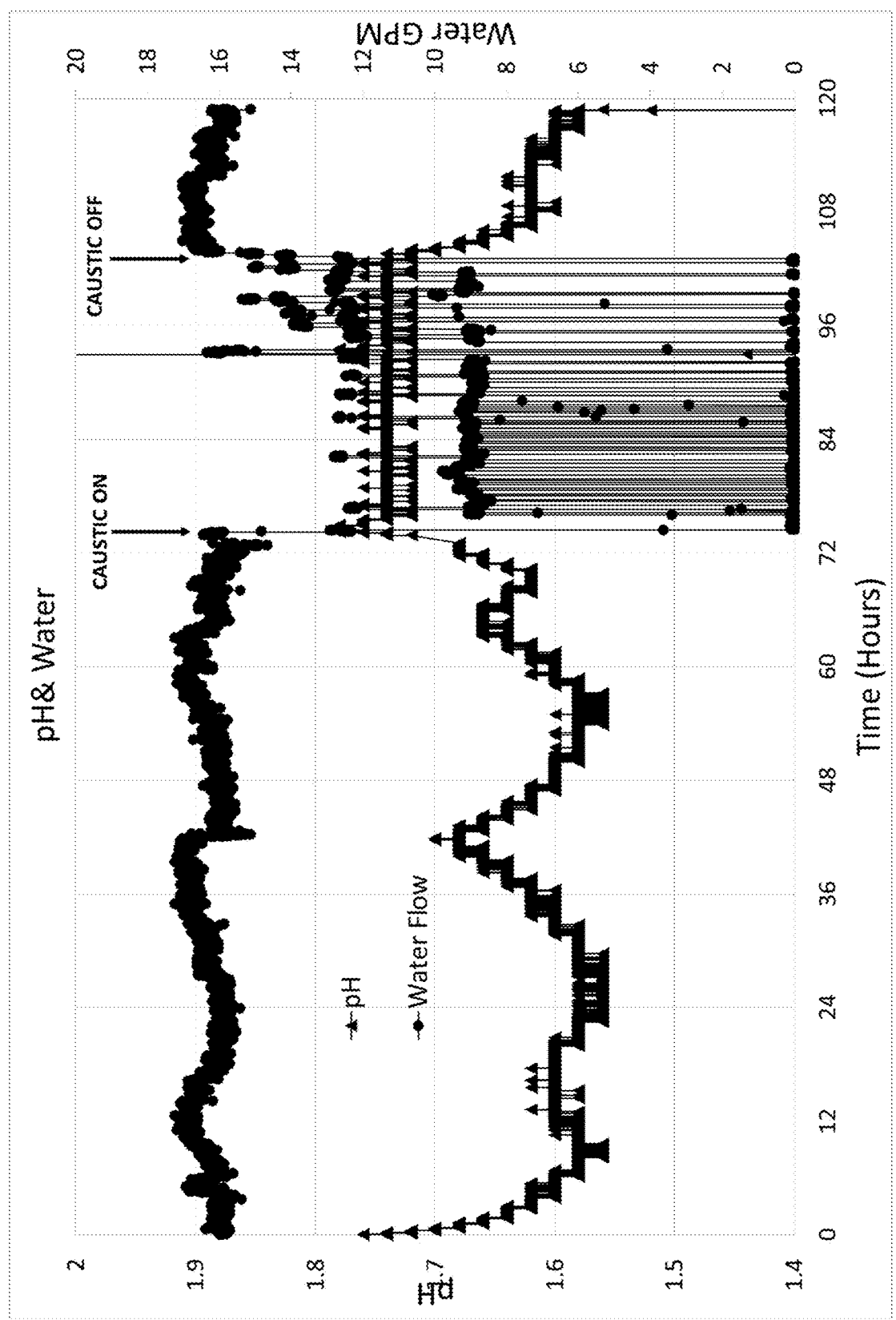
FIG. 8 is chart of data obtained during testing of an embodiment of a biofilter as disclosed herein.
Figure 10:
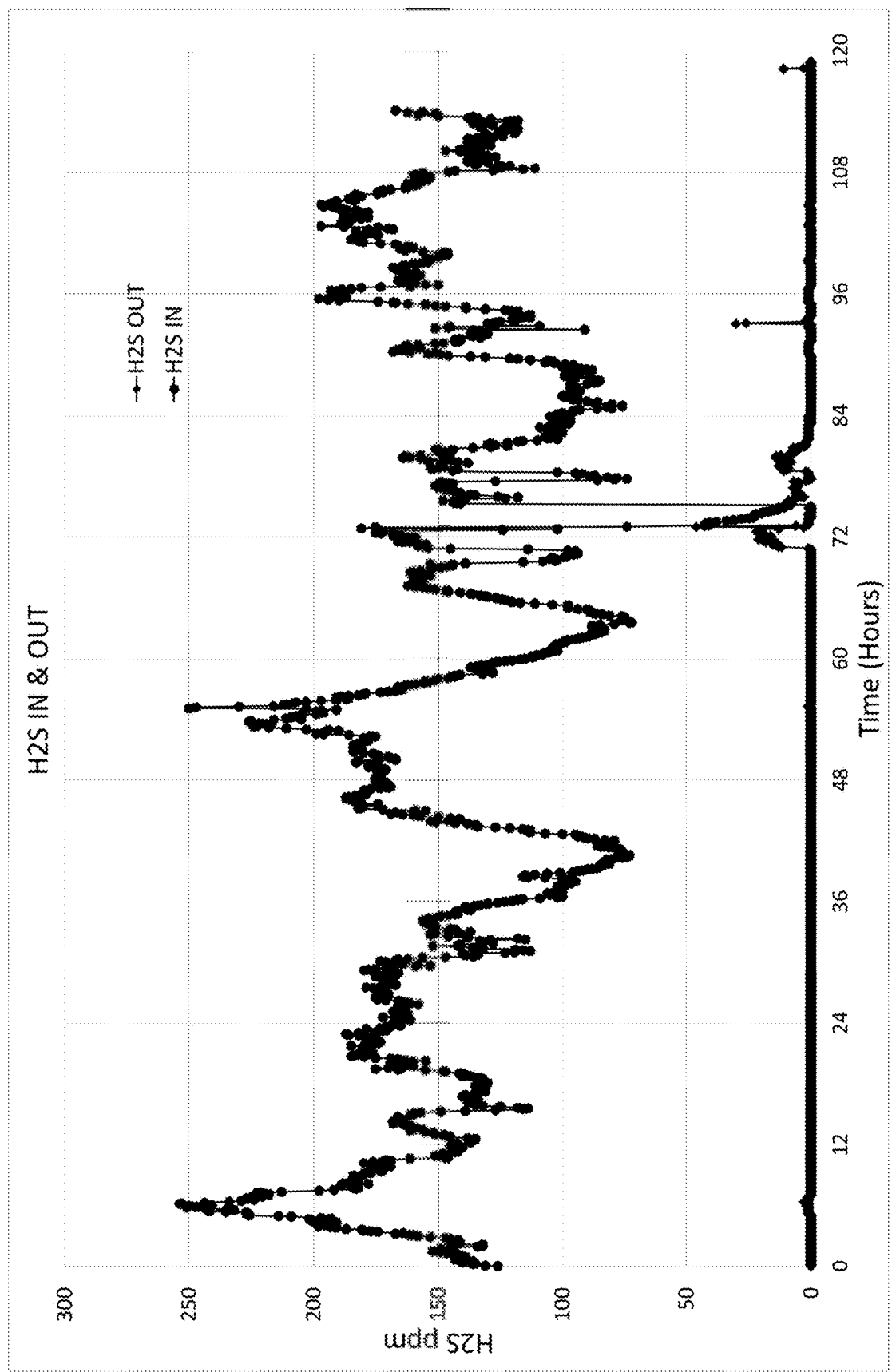
FIG. 10 is another chart of data obtained during testing of an embodiment of a to biofilter as disclosed herein.

At hour 103 the caustic soda feed was terminated, while the pH logic control was allowed to continue to operate. A steady drop in pH was observed, beginning as soon as the caustic soda feed was terminated (FIG. 10). The impact on water usage is immediately observable as without the additional neutralization provided by the to caustic the logic control commanded the water valve to open 100% in attempt to bring the pH back up to the 1.72 set point. Even at maximum flow, the site-available flow rate of 16.9 gpm was not sufficient to maintain the 1.72 set point and as a result, the valve remained open at maximum flow for the remainder of the testing (FIG. 8).

The final parameter that was evaluated in this test was the inlet $H_2S$ vs. outlet $H_2S$ before, during, and after the caustic addition. It was important to establish that the addition of caustic would not have a negative impact on the biology of the BTF, and that the reduction in water would not decrease the performance of the BTF. As can be seen from FIG. 10, $H_2S$ removal was maintained during the experiment without any large fluctuations in performance during or after caustic addition. The one caveat to this is the brief and small rise in outlet $H_2S$ from hours 71-80, which was a result of a depleted nutrient reservoir. As soon as the nutrient reservoir was replenished, the outlet $H_2S$ dropped to previous levels, and was maintained to the end of the testing.

TABLE 7

Example 2 Operation Summary

| Start Time | End Time | Caustic Soda Feed (GPD) | Make-Up Water Feed (GPM) | Average pH | Minimum pH | Maximum pH | Average Influent $H_2S$ (PPM) |
|---|---|---|---|---|---|---|---|
| 0 Hours | 74 Hours | 0 | 16.9 | 1.61 | 1.56 | 1.70 | 150 |
| 74 Hours | 103 Hours | 30 | 4.96 | 1.73 | 1.70 | 1.78 | 130 |
| 103 Hours | 118 hours | 0 | 16.9 | 1.62 | 1.52 | 1.68 | 150 |

Example 2: Conclusion

Optimizing water usage in biofiltration systems using fuzzy logic pH control and alkaline addition is a large step forward in the sustainable design of these systems, and exhibits tangible economic and environmental benefits. The pH control system allows the water usage to be adjusted automatically to match demand, reducing unnecessary water expenditures. The alkaline addition reduces water usage to by neutralizing sulfuric acid instead of simply diluting it. Addition of caustic soda, to neutralize a portion of the sulfuric acid, is shown to decrease make-up water demand. It is expected that the use other alkaline materials would show a similar benefit. Using fuzzy logic and alkaline addition together, water usage can be optimized.

Aspects and embodiments disclosed herein are not limited by the type of biofilter, the media used within the biofilter, the type and location of pH monitoring device, the type and location of the control valve and the type of fuzzy logic controller used. It is not limited to the removal of $H_2S$ and can be used to remove any compound capable of being removed by a biofilter. More than one biofilter can be used in a staged configuration. If a staged configuration is used, the parameter of interest, for example, pH, is monitored and controlled from each stage. Multiple fuzzy logic controllers can be used in a staged configuration. An acid and/or a base may be introduced into the make-up water to control the pH.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases to "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure, and are intended to be within the scope of the invention. Accordingly, the foregoing description and drawings are by way of example only.

What is claimed is:

1. A method of removing hydrogen sulfide from contaminated air, the method comprising:
    flowing the contaminated air through a biotrickling filter including a media bed and a population of hydrogen sulfide oxidizing bacteria disposed on media in the media bed, the population of bacteria oxidizing hydrogen sulfide in the contaminated air into sulfuric acid;
    introducing water from a source of water into the biotrickling filter;
    measuring a pH of water having passed through the media bed;
    maintaining the pH of the water having passed through the media bed within a predetermined range below about 4 by:
        adding an alkaline material to the biotrickling filter; and
        controlling an amount of one of the alkaline material added to the biotrickling filter per unit time and an amount of the water added to the biotrickling filter per unit time utilizing a fuzzy logic algorithm performed on a fuzzy logic-based controller, the fuzzy logic algorithm using a difference between the pH of the water having passed through the media bed and a predetermined pH setpoint (an error value) and a change in pH of the water having passed through the media bed per unit time (an error-dot value) as sole input parameters, the fuzzy logic algorithm having a total of five rules and a total of five fuzzy output sets to determine an output used to control the amount of the one of the alkaline material added to the biotrickling filter per unit time and the amount of the water added to the biotrickling filter per unit time; and
    providing sufficient water from the source of water to the media bed to rinse salts produced by reaction between the alkaline material and the sulfuric acid from the media bed to prevent clogging of the media bed.

2. The method of claim 1, further comprising controlling one of the amount of water introduced to the biotrickling filter per unit of time and the amount of the alkali material added to the biotrickling filter per unit time with a manually operated flow controller.

3. The method of claim 1, further comprising selecting the predetermined range to maintain a pH in the media bed within a range conducive to maintenance of the population of hydrogen sulfide oxidizing bacteria.

4. The method of claim 3, further comprising maintaining the pH in the media bed between about 0 and about 4.

5. The method of claim 4, further comprising maintaining the pH in the media bed between about 1.6 and about 2.2.

6. The method of claim 1, further comprising introducing the alkaline material into a vessel of the biotrickling filter with the water from the source of water.

7. The method of claim 1, further comprising introducing the alkaline material into a sump of the biotrickling filter.

8. The method of claim 1, further comprising supplying nutrients for the bacteria into the biotrickling filter, the nutrients including nitrogen, potassium, and phosphorus compounds.

9. The method of claim 8, further comprising measuring a concentration of the nutrients in fluid that is one of within the biotrickling filter or drained from the biotrickling filter, and controlling a rate of introduction of the nutrients based on the concentration of the nutrients in the fluid.

10. The method of claim 1, wherein flowing the contaminated air through the biotrickling filter includes flowing the contaminated air through foamed glass media in the media bed.

11. The method of claim 1, further comprising measuring a pressure differential across the media bed and adjusting a speed of a blower configured to cause the contaminated air to flow through the biotrickling filter based on the pressure differential.

12. The method of claim 1, further comprising one of introducing the alkaline material into the biotrickling filter at a fixed rate and adjusting the amount of water introduced to the biotrickling filter per unit of time, or introducing the water into the biotrickling filter at a fixed rate and adjusting the amount of the alkaline material introduced to the biotrickling filter per unit of time.

13. The method of claim 1, resulting in a reduction in water usage by the biotrickling filter by at least 50% as compared to a substantially similar biotrickling filter operating under substantially similar conditions but without introduction of the alkaline material into the biotrickling filter.

14. The method of claim 13, resulting in a reduction in water usage by the biotrickling filter by at least 99% as compared to the substantially similar biotrickling filter operating under the substantially similar conditions but without introduction of the alkaline material into the biotrickling filter.

15. The method of claim 1, further comprising measuring a concentration of hydrogen sulfide in the contaminated air and adjusting a speed of a blower configured to cause the contaminated air to flow through the biotrickling filter based on the concentration of hydrogen sulfide in the contaminated air.

16. The method of claim 1, wherein the alkaline material includes one or more of magnesium hydroxide, potassium hydroxide, calcium hydroxide, sodium hydroxide, potassium carbonate, and sodium carbonate.

17. The method of claim 1, wherein the fuzzy logic controller performs repeated instances of controlling the amount of the one of the alkaline material added to the biotrickling filter per unit time and the amount of the water added to the biotrickling filter per unit time, the repeated instances separated in time by an amount of time after which a steady state pH would be re-established in the media bed after a change in the amount of the one of the alkaline material added to the biotrickling filter per unit time and the amount of the water added to the biotrickling filter per unit time.

18. The method of claim 1, wherein the fuzzy logic algorithm utilizes a total of three fuzzy error sets and the fuzzy logic controller assigns the error value to one or more of the three fuzzy error sets.

19. The method of claim 1, wherein the fuzzy logic algorithm utilizes a total of three fuzzy error-dot sets and the fuzzy logic controller assigns the error-dot value to one or more of the three fuzzy error-dot sets.

* * * * *